(12) United States Patent
Gongloor et al.

(10) Patent No.: US 9,983,918 B2
(45) Date of Patent: May 29, 2018

(54) CONTINUOUS CAPTURE OF REPLAYABLE DATABASE SYSTEM WORKLOAD

(71) Applicant: ORACLE INTERNATIONAL CORPORATION, Redwood Shores, CA (US)

(72) Inventors: Prabhaker Gongloor, San Jose, CA (US); Yujun Wang, Los Gatos, CA (US); Mughees A. Minhas, Palo Alto, CA (US); Haranadh Poduri, Foster City, CA (US); Karl Dias, Foster City, CA (US); Leonidas Galanis, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 215 days.

(21) Appl. No.: 14/974,059

(22) Filed: Dec. 18, 2015

(65) Prior Publication Data

US 2017/0123877 A1     May 4, 2017

Related U.S. Application Data

(60) Provisional application No. 62/248,614, filed on Oct. 30, 2015.

(51) Int. Cl.
*G06F 11/00* (2006.01)
*G06F 11/07* (2006.01)
*G06F 17/30* (2006.01)

(52) U.S. Cl.
CPC ........ *G06F 11/079* (2013.01); *G06F 11/0706* (2013.01); *G06F 11/0751* (2013.01); *G06F 11/0778* (2013.01); *G06F 11/0787* (2013.01); *G06F 17/30289* (2013.01)

(58) Field of Classification Search
CPC .............. G06F 11/079; G06F 11/0706; G06F 11/0751; G06F 11/0778; G06F 11/0787; G06F 17/30289
See application file for complete search history.

(56) References Cited

U.S. PATENT DOCUMENTS

| 7,890,457 | B2 | 2/2011 | Dias et al. |
| 7,890,458 | B2 | 2/2011 | Dias et al. |
| 7,984,015 | B2 | 7/2011 | Dias et al. |
| 8,024,299 | B2 | 9/2011 | Dias et al. |

(Continued)

*Primary Examiner* — Jason B Bryan
(74) *Attorney, Agent, or Firm* — Tarolli, Sundheim, Covell & Tummino LLP

(57) ABSTRACT

Systems, methods, and other embodiments associated with continuous capture of replayable workload for a database are described. In one embodiment, a method includes capturing workload units being executed on a production database and storing the captured workload units in a circular workload buffer. The circular workload buffer is configured to write newest captured workload units over oldest workload units in the workload buffer when the workload buffer becomes full. The method includes, in response to detecting an event, exporting contents of the workload buffer to offline memory. The exporting includes at least one I/O operation. In one embodiment, an advisor feature guides set up of the continuous capture feature by providing historical workload data and making recommendations regarding an amount of memory that should be allocated to the workload buffer.

17 Claims, 6 Drawing Sheets

(56) References Cited

U.S. PATENT DOCUMENTS

| | | | |
|---|---|---|---|
| 8,326,816 B2 | 12/2012 | Colle et al. | |
| 8,380,664 B2 | 2/2013 | Papadomanolakis et al. | |
| 8,380,665 B2 | 2/2013 | Papadomanolakis et al. | |
| 8,433,680 B2 | 4/2013 | Ling et al. | |
| 8,438,144 B2 | 5/2013 | Colle et al. | |
| 8,732,126 B2 | 5/2014 | Dias et al. | |
| 8,954,397 B2 | 2/2015 | Wang et al. | |
| 2002/0138788 A1* | 9/2002 | Yenne | G06F 9/465 714/38.12 |
| 2004/0015600 A1 | 1/2004 | Tiwary et al. | |
| 2004/0078723 A1* | 4/2004 | Gross | G06F 11/3476 714/47.2 |
| 2007/0230486 A1* | 10/2007 | Zafirov | H04L 43/12 370/401 |
| 2012/0221513 A1 | 8/2012 | Papadomanolakis et al. | |
| 2012/0221519 A1 | 8/2012 | Papadomanolakis et al. | |
| 2013/0232113 A1* | 9/2013 | Liang | G06F 11/3414 707/634 |
| 2015/0127994 A1* | 5/2015 | Sankar | G06F 11/348 714/45 |

* cited by examiner

Buffer Settings

| | |
|---|---|
| Buffer Location: | /usr/filesystem |
| Buffer Size: | 150 GB |
| AutoExtensible: | Yes |
| Alert Threshold: | 80% |
| Export: | Yes / No |
| Criteria: | Last N minutes<br>Critical Event |
| Location: | /usr/filesystem2 |

330

Capture Settings

Target Replay Time: 60 min

Replay Time Guaranteed?: Yes / No

Capture Filters: None

320

Replay Settings

Replay Database: Replay DB Configuration

Replay Options:
　　Read-Only / Read and Write / SQL Only
　　Last N minutes

CONTINUOUS CAPTURE OF REPLAYABLE DATABASE SYSTEM WORKLOAD

CROSS REFERENCE TO RELATED APPLICATIONS

This disclosure claims the benefit of U.S. Provisional Patent Application Ser. No. 62/248,614 filed Oct. 30, 2015, titled "CONTINUOUS CAPTURE OF REPLAYABLE DATABASE SYSTEM WORKLOAD", inventors: Gongloor, Wang, Minhas, Poduri, Dias, and Galanis, and assigned to the present assignee.

BACKGROUND

Diagnosing database problems is a continuing difficulty for database administrators, especially as database systems interact with more and more clients (e.g., a transactional database system). Multiple clients access multiple application servers to perform operations on a database in parallel. When a malfunction or bottleneck occurs, it is difficult to pinpoint which operation or operations caused the problem. If the root cause of problem is not diagnosed, the database system is vulnerable to repeat occurrences of the same adverse database event.

BRIEF DESCRIPTION OF THE DRAWINGS

The accompanying drawings, which are incorporated in and constitute a part of the specification, illustrate various systems, methods, and other embodiments of the disclosure. The illustrated element boundaries (e.g., boxes, groups of boxes, or other shapes) in the figures represent one embodiment. In some embodiments one element may be implemented as multiple elements or that multiple elements may be implemented as one element. In some embodiments, an element shown as an internal component of another element may be implemented as an external component and vice versa. Furthermore, elements may not be drawn to scale.

FIGS. 3A and 3B are example screen shots of interface screens used in one embodiment to receive configuration data from a user and to make configuration recommendations to the user, respectively.

DETAILED DESCRIPTION

Today, in order to diagnose and reproduce a problem that occurs in a production database system, a database administrator enables database diagnostic tracing capabilities in the hope that the problem reoccurs in the database and enough diagnostic data is captured. Enabling database diagnostics capabilities imposes significant overhead on the database system. If the data collected by the traces is not sufficient, higher level and more expensive diagnostic traces are enabled in the hope that the next time the problem occurs, it can be diagnosed. Thus, when using diagnostic traces, the problem must be encountered at least one more time before it can be diagnosed.

Systems and methods are described herein that provide continuous capture of replayable workload for a database system. The systems and methods herein continuously record the workload being experienced by a production database. A most recent portion of the workload is maintained in a buffer and the systems and methods described herein can apply the buffered workload to a replay database. The replay database can be made to correspond to the production database reverted back to its condition when the buffered workload begins. This allows an administrator to recreate, on the demand and without having already enabled diagnostic capabilities, the exact event that led to a given problem.

Figure 1:
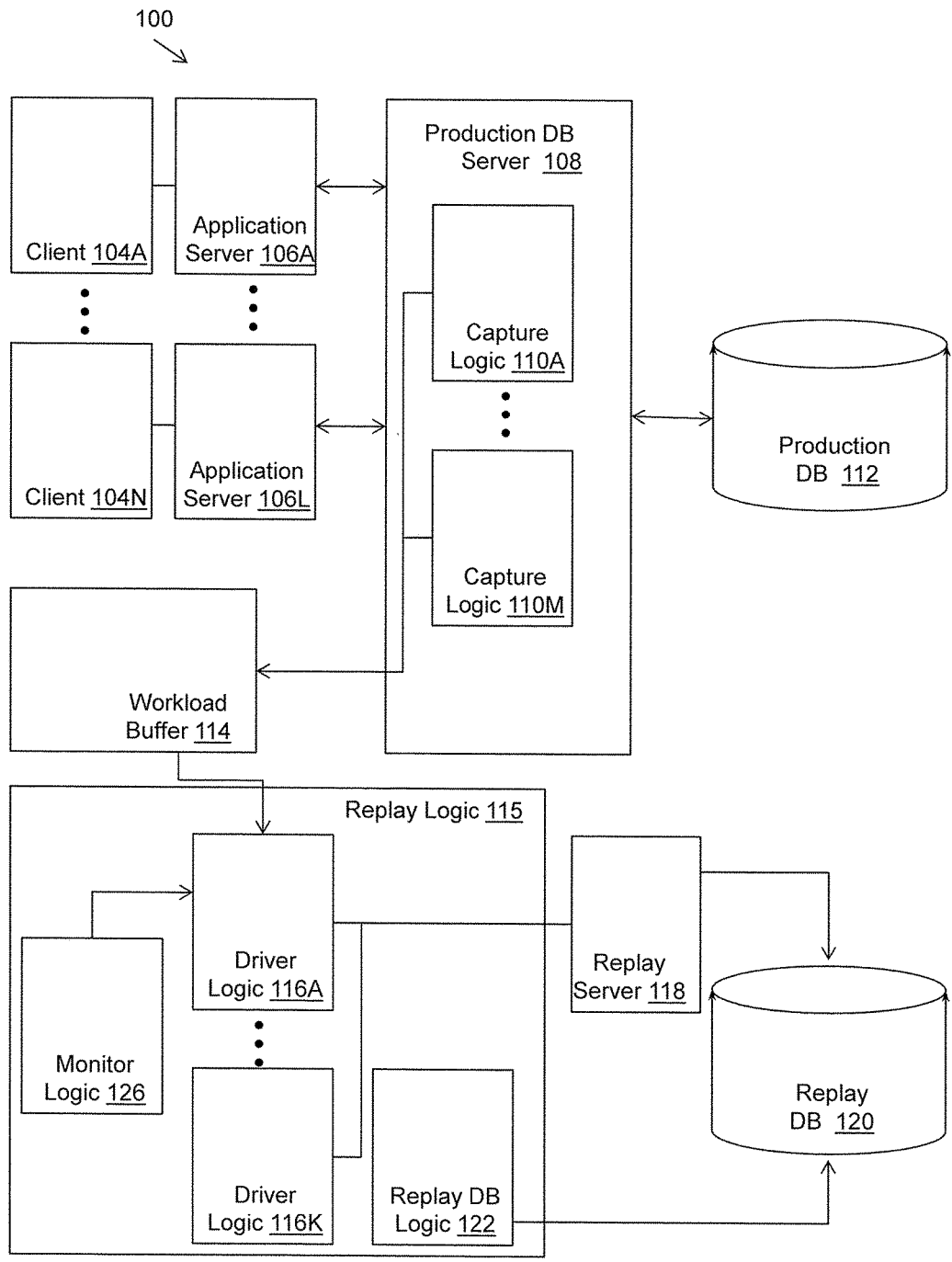
FIG. 1 illustrates one embodiment of a system associated with continuous capture of replayable workload for a database system.

With reference to FIG. 1, one embodiment, of a database system 100 that provides a continuous capture feature is illustrated. The system 100 includes clients 104A-104N, application servers 106A-106L, a production database server 108, a production database 112, workload buffer 114, replay logic 115, and replay database 120. The production database server 108 includes capture logics 110A-110M. The replay logic 115 includes driver logic 116A-116K, a replay database server 118, and replay database logic 122. For the purposes of this description, the production database server 108 and the production database 112 will be referred to, collectively, as the "production database system."

Clients 104A-104N may be separate computers or separate processes that execute on the same computer. For example, in one embodiment, the clients 104A-104N are Internet browsers (e.g., Mozilla Firefox) that execute on separate computers to communicate with the Internet. The clients 104A-104N send requests to, and receive responses from, application servers 106A-106L.

Application servers 106A-106L may be separate computers or separate processes that execute on the same computer. For example, in one embodiment, the application servers 106A-106L are web server-invoked processes that execute on separate servers that communicate with the Internet. The application servers 106A-106L receive requests from, and send responses to, clients 104A-104N over the Internet. Each of the application servers 106A-106L may implement different functionality for responding to different types of requests from the clients 104A-104N.

In servicing requests from the clients 104A-104N, the application servers 106A-106L might need to retrieve data from and/or store data to a database. To accomplish this, the application servers 106A-106L establish database sessions with the production database server 108. Within these sessions, the application servers 106A-106L send database commands to the production database server 108. Such database commands may include Structured Query Language (SQL) select statements, for example.

The production database server 108 executes these database commands relative to the production database 112. As a result of the executing of these database commands, the production database server 108 may store data in, and/or retrieve data from, the production database 112. The production database server 108 may execute two or more database commands in a transactional manner, so that none of the effects of the database commands in a single transaction are made permanent in the production database 112 unless all of the effects of those database commands can be made permanent. The production database server 108 may return, to the application servers 106A-106L, data retrieved from the production database 112 as a result of the execution of certain database commands (e.g., SQL select statements). The application servers 106A-106L may use such retrieved data in forming responses to clients 104A-104N.

The capture logics 110A-110M may be implemented as separate concurrently executing processes or as concurrently executing threads of the same process. The capture logics 110A-110M are capable of collectively, transparently, and non-intrusively capturing all workload that the production database server 108 receives from external entities (e.g., the application servers 106A-106L and or the clients 104A-104N).

As used herein, the term "workload" refers to discrete, independently meaningful units called "workload units". In one embodiment, each workload unit corresponds to a separate "user request" (e.g., a request originating from (a) one the clients 104A-104N, (b) one of the application servers 106A-106L, or (c) some other process that is external to the production database server 108. The capture logics 110A-110M store and record this workload data in the workload buffer 114. In one embodiment, the workload represents actual real-world use of the production database server 108, which use is not specifically for any testing purpose.

In one embodiment, the workload buffer 114 is a self-managing circular buffer configured to store a most recent portion of the on-going workload data (e.g., the last 30 minutes). The workload buffer 114 is an in-memory allocated buffer, meaning that an I/O transaction is not needed to store the workload data in the buffer which significantly increases the speed with which the workload data can be stored in the workload buffer 114. This reduces the impact that the storing of the workload data has on overall system performance. Being a circular buffer, the workload buffer 114 automatically overwrites the oldest workload data to maintain the desired workload interval, buffer space budget, or performance overhead threshold. As will be discussed in more detail below, the amount of memory allocated to the workload buffer 114 is chosen in a manner that guarantees some minimum workload interval, which is a period of time during which the buffered workload occurred.

In one embodiment, the workload buffer 114 is allocated in a shared global area (SGA) of memory that is accessible by all of the processes that write workload for the production database system. Use of an SGA allocated in-memory buffer means that fewer "open file" and "file handle" operations are needed to capture the workload. This results in the ability to scale the workload capture to thousands of sessions. Many processes can multiplex into the in-memory buffer at assigned addresses allocated to each process. Further, only active processes consume memory in the workload buffer because there is no need for the process to open a file upfront.

In one embodiment, the workload buffer 114 includes an in-memory cache (not shown) to which workload data is first written. Once the cache becomes full, the workload data is flushed to the workload buffer 114, which is "on-disk" with respect to the replay logic 115. This embodiment reduces overhead and increases the speed with which workload data may be provided to the replay logic 115.

In one embodiment, the contents of the workload buffer 114 are periodically automatically exported to offline storage so that earlier portions of the workload may also be replayed. In one embodiment, an enterprise manager event management system (not shown) exports the contents of the workload buffer 114 to offline storage in response to detecting selected database events (e.g., severe performance degradation, system failure, and so on). The various configuration options for the workload buffer 114 may be managed by a database administrator as described with reference to FIG. 2.

The replay logic 115 controls the replaying of the workload stored in the workload buffer 114 on a replay database 120. The replay logic 115 includes driver logics 116A-116K, replay database server 118, and replay database logic 122. The driver logics 116A-116K read the workload from the workload buffer 144 and send the workload to the replay database server 118. The driver logics 116A-116K may be implemented as separate concurrently executing processes or as concurrently executing threads of the same process, for example. In sending the workload to the replay database server 118, the driver logics 116A-116K subject the replay database server 118 to the same workload to which clients 104A-104N and/or application servers 106A-106L subjected the production database server 108 during the workload time interval.

In one embodiment, the driver logics 116A-116K synchronize the sending of workload units to the replay database server 118 so that the differences in time between the replay database server's receipt of those workload units corresponds to the differences in time between the production database server's previous receipt of those same workload units during the recording interval. Thus, in one embodiment, the duration of the interval of time during which the driver logics 116A-116K send workload to the replay databases server 118 is identical to the duration of the interval of time during which the clients 104A-104N sent that same workload to the production database server 108. In one embodiment, the driver logics 116A-116K replay the workload to the replay database server 118 in a manner that preserves all transactional dependencies that exist between transactions that are stored in the workload buffer 114.

In one embodiment, each of the driver logics 116A-116K can replay workload that was captured by multiple separate capture logics 110A-110M. Therefore, in one embodiment, there may be fewer driver logics 116A-116K than capture logics 110A-110M. Each of the driver logics 116A-116K may be multi-threaded.

In one embodiment, to facilitate accurate diagnosing of production database system problems, the replay database server 118 is as similar as possible to the production database server 108. For example, the replay database server 118 may be the same version as the production database server 108. The replay database server 118 may execute on a machine that has the same type of hardware as the machine the production database server 108 executes. The replay database server 118 may execute in conjunction with the same operating system as the production database server 108. In other embodiments, the replay database server 118 may differ from the production database server 108 in selected ways that either enhance the diagnostic process or do not affect the diagnostic process.

The replay database server 118 processes the workload that the replay database server 118 receives from the driver logics 116A-116K. If the workload comprises database commands, the replay database server 118 executes the database commands relative to the replay database 120. As a result of the executing of these database commands, the replay database server 118 may store data in, and/or retrieve data from, the replay database 120. The replay database server 118 may execute two or more database commands in a transactional manner, so that none of the effects of the database commands in a single transaction are made permanent in the replay database 120 unless all of the effects of those database commands can be made permanent. The replay database server 118 may return, to driver logics 116A-116K, data retrieved from the replay database 120 as a result of the execution of certain database commands (e.g., SQL select statements).

While one instance of the production database server 108 and one instance of the replay database server 118 are shown, in alternate embodiments, there may be multiple production database server instances, all of which perform database operations relative to the production database 112. Additionally, in alternative embodiments, there may be multiple replay database server instances, all which perform database operations relative to the replay database 120. In one embodiment, the number of production database server instances differs from the number of replay database server instances.

In one embodiment, to facilitate accurate diagnosing of problems in the production database system, the replay database 120 is as similar as possible to the production database 112. For example, the manner in which logical relational database structures are physically laid out and stored on disk in the replay database 120 may very similar to the manner in such logical relational database structures are physically laid out and stored on disk in the production database 112. Additionally, the manner in which the relational tables are partitioned in the replay database 120 may be very similar to the manner in which the production database is partitioned. Additionally, indices that are (or are not) constructed for relational tables in the replay database 120 may be very similar to the indices that are (or are not) constructed for corresponding relational tables in the production database 112. In one embodiment, the replay database 120 is a backup, mirror, or fail-over database associated with the production database 112.

Prior to the replay, the replay database 120 is configured by the replay database logic 122 to synchronize the replay database to the state the production database was in at a logical point that marks the beginning of the workload interval. In one embodiment, the replay database logic 122 determines the time interval during which the buffered workload stored in the workload buffer 114 occurred. The replay database logic 122 accesses a standby, mirror, or back up version of the production database 112 and applies or rolls back database commands from the workload until the standby database is aligned, in time, with the production database's condition at the beginning of the workload interval.

In one embodiment, the replay database logic 122 interacts with a system change number (SCN)-based database backup system (not shown) to generate the replay database 120. The SCN-based database backup system is capable of recreating the production database's state at any given point in the workload. An SCN-based database backup system is present in many production database systems and is used as a fail over in case of malfunctions in the production database. An SCN is a "logical time value" that is assigned to each workload unit. For example, an SCN may be assigned to each SQL command in the workload. Each SCN reflects the transaction environment in whose context the corresponding workload unit should be processed. In one sense, each SCN signifies a "snapshot" of the database state. The SCN reflects the state of the database that should be visible to the corresponding command when that command is executed or otherwise processed. In one embodiment, higher SCNs indicate later-occurring database states than are indicated by lower SCCNs that precede them. However, it is possible for multiple workload units to have the same SCNs.

In one embodiment, the SCNs are included in the workload that is captured by the capture logics 110A-110M and stored in the workload buffer 114. The SCN-based backup system is capable of reproducing the production database 112 state as of any given SCN. Thus, the replay database logic 122 can determine the earliest SCN associated with the workload units stored in the workload buffer 114 and provide this SCN to the SCN-based backup system. In response, the SCN-based backup system restores the backup database to the state corresponding to the SCN received from the replay database logic 122, or possibly an even earlier SCN. This essentially captures the pre-workload state of the production database 108 as the replay database 120.

Because the driver logics 116A-116K are capable of replaying the workload in the workload buffer 114 to the replay database server 118, it is not necessary to have duplicate clients or duplicate application servers. This advantageously saves resources.

As discussed above, in one embodiment, the capture logics 110A-110M intercept and store, in the workload buffer 114, the workload that the production database server 108 receives from entities that are external to the production database server 108. The driver logics 116A-116K read and replay the workload to the replay database server. In one embodiment, the logics 110a-110M are implemented within and as a part of the production database server 108. For example, the capture logics 110A-110M may be implemented as commands within the source code of the production database server 108. As part of the production database server 108, the capture logics 110A-110M are privy to all of the information to which the production database server 108 is privy. In such an embodiment, the code of the production database server 108 comprises functionality that inspects workload at various points in the processing of that workload. Such code may capture actual content with the received workload and/or data that is derived from the production database server's processing of that content.

Captured Workload

In one embodiment, the information that the capture logics 110A-110M intercept and store in the workload buffer 114 includes information that is sufficient to allow a transactionally consistent replay of the buffered workload to be performed relative to the replay database server 118 and the replay database 120. Such information allows the replay database 120 to be subjected to a workload that is practically indistinguishable from the workload to which the production database 112 was originally subjected. A description of the kinds workload and information, called "the captured workload", that the capture logics 110A-110M intercept and store in the workload buffer 114 and which the driver logics 116A-116K read and replay is now described.

In one embodiment, the captured workload includes five main kinds of information: SQL and PL/SQL workload, non-SQL workload, transactional data, call (workload unit) context, and special function instrumentation. However, in various alternative embodiments, workload may include additional, fewer, or different kinds of data than those expressly described herein. In one embodiment, the captured workload includes all operations that are to be performed on data in the production database 112. In one embodiment, the captured workload includes all data that the production database server 108 receives from entities that are external to the production database server 108, but in alternative embodiments, the captured workload may exclude some of this data.

In one embodiment, SQL and PL/SQL workload includes SQL statement text, SQL statement arguments (e.g., bind values), and miscellaneous environment attributes that are set by clients (e.g., clients 104A-N and application servers 106A-N). These environment attributes may include Oracle Call Interface ("OCI") attributes that affect server performance, such as row pre-fetching. OCI is a set of low-level application programming interface ("API") calls that client and application programs may use to interact with Oracle databases. OCI allows a program to use operations such as logon, execute, parse, fetch, etc. In one embodiment, in addition to the kinds of information described above, the capture logics 110A-110M also capture some performance data in order to facilitate diagnosis of problems in the production database 112. Such performance data may include, for example, errors, row counts, elapsed time, and time model statistics.

In one embodiment, the capture logics 110A-110M only capture SQL statements that originate externally to production database server 108. In one embodiment, the capture logics 110A-110M do not capture SQL statements that originate from within production database server 108. Some SQL statements that the production database server 108 receives from entities external to the production database server 108 may cause mechanisms within the production database server 108 to create further SQL statements. In one embodiment, the capture logics 110A-110M do not capture these latter SQL statements that are created by mechanisms within the production database server 108.

In one embodiment, the captured workload includes each SQL statement that the production database server 108 receives from external entities. In one embodiment, the capture logics 110A-110M establish a mapping between each such SQL statement and that SQL statement's corresponding cursor number. A cursor number is a SQL statement identifier that exists and is used within the production database server 108. In one embodiment, the captured workload includes this cursor number, which may be used in order to facilitate replay of the SQL statements. In one embodiment, a cursor number may be associated with a particular SQL statement after that statement has been optimized. If the same particular SQL statement is repeated, and if the cursor has not been closed, then the cursor number may be used to refer to the already-optimized statement instead of re-optimizing the SQL statement.

In one embodiment, whenever a SQL statement becomes associated with a cursor number during the recording interval, capture logics 110A-110M include, in the captured workload, a mapping between the cursor number and the SQL statement. In one embodiment, when the production database server 108 receives a SQL statement for which there is an already-open cursor, the cursor number of this cursor, rather than the entire SQL statement, is included in the captured workload and stored in the workload buffer 114. As a result, captured workload is more compact and consumes less space. Because the cursor numbers are included in the captured workload along with a mapping between those cursor numbers and the SQL statements to which those cursor numbers refer, the driver logics 116A-116K may use the cursor numbers at replay time to determine and replay the SQL statements that are associated with those cursor numbers.

In one embodiment, captured workload includes the various operations that can be performed as a result of each SQL or PL/SQL statement that the production database server 108 receives. In one embodiment, these operations include parse, execute, cursor fetch, and cursor close. Parsing is the compilation of the statement, and includes optimization. Execution is the actual execution of the statement. If the statement is a query, then a cursor for the query may be created and opened. Cursor fetch gets the next result for the query. Cursor close closes an open cursor, precluding any further fetching from that cursor. In one embodiment, the production database server 108 (and, more specifically, the capture logics 110A-110M) determines a type (e.g., parse, execute, fetch, etc.) of each request or command that is received by the production database server. The type is included in the captured workload and stored in the workload buffer 114.

Each SQL and PL/SQL statement can contain place holders that accept parameters from applications. For example, in the statement "select empname from emp where id::v1," v1 is a bind variable that is set (or "bound") by an application. In one embodiment, the captured workload includes all of these "binds" that are performed during execution of SQL statements that production database server 108 receives. Thus, in one embodiment, the production database server 108 (and, more specifically, the capture logics 110A-110M) include, in the captured workload, bind values that are specified in SQL statements that the production database server 108 receives. In one embodiment, there are two types of binds: in-binds and out-binds. In one embodiment, the captured workload includes all in-binds and selected out-binds. More specifically, in one embodiment, the only out-binds that are included in the captured workload are those out-binds that specifically bind values, such as ROWIDs and large object (LOB) locators. In one embodiment, this data is used for remapping during replay. Remapping is discussed in greater detail below.

When executed, SQL SELECT statements may cause the production database server 108 to return, to the originators of the statements, values that satisfy the criteria specified in the statements. In one embodiment, the captured workload includes selected values that are returned as a result of the execution of SQL SELECT statements. Specifically, in one embodiment, the captured workload includes ROW IDs and LOB locators that correspond to such values. In one embodiment, this data is used for remapping during replay.

In one embodiment, workload includes non-SQL workload such as session operations, PL/SQL remote procedure calls, and all data that is necessary to recreate certain large object (LOB) workload OCI calls. In one embodiment, for each session that is established with production database server 108, the captured workload includes that session's user name, the NLS environment, and all session attributes that are needed to recreate session operations such as authentication, logon, logoff, and session switch. In one embodiment, along with other information that is captured in conjunction with a session login operation, the captured workload includes session connection identifiers. These session connection identifiers may be used during replay to define connections. In one embodiment, each time that an entity logs into or logs out from the production database server 108, the capture logics 110A-110M capture and include these logins and logouts, and the parameters and attributes thereof, in captured workload that is stored in the workload buffer 114.

In one embodiment, the captured workload includes the method names of methods that are invoked inside the production database server 108 via PL/SQL remote procedure calls (RPCs). In one embodiment, the captured workload includes the parameters that are passed to such methods. OCI has functionality that allows the manipulation of large objects inside of a database. These large objects are identified by LOB locators. In one embodiment, the capture logics 110A-110M capture all of the data that is needed to reproduce OCI LOB calls.

In one embodiment, the captured workload includes transactional data that may be used to facilitate synchronized replay. For example, in one embodiment, the captured workload includes transactional data such as the environment SCN of a workload unit. The environment SCN of a workload unit defines the state of the database that should be "seen" by a statement in that workload unit. Each SCN is a logical time value that expresses a state in time in a relative rather than an absolute sense. In one embodiment, the captured workload includes transactional data such as the commit SCN of a commit action. A commit SCN denotes a transition from one database state to another database state. In one embodiment, the captured workload includes transactional data such as a dependent SCN (described in greater detail further below). A dependent SCN permits the outcome of block-level contention between transactions to be determined during capture.

In one embodiment, the captured workload includes transactional data such as transaction boundaries, which indicate the beginning and ending of a transaction. In one embodiment, the captured workload includes call context data such as the beginning and ending of each workload unit. In one embodiment, the captured workload includes, for each workload unit, statistics such as elapsed time and database time. For each workload unit, the capture logics 110A-110M may include, in the captured workload, both (a) information that indicates a time at which the production database server 108 received that workload unit, and (b) information that indicates an amount of time that passed between the time that the production database server 108 received that workload unit and the time that the production database server 108 began processing, and/or finished processing, that workload unit. Such statistics may be used for reporting purposes.

In one embodiment, the captured workload includes the return values of special functions that should be emulated during replay. For example, in one embodiment, the captured workload includes values returned by function NEXTVAL of a sequence. For another example, in one embodiment, the captured workload includes values returned by function CURRVAL of a sequence. For yet another example, in one embodiment, the captured workload includes unique server-generated identifiers, such as those that are generated by the SYS_GUID function. For another example, in one embodiment, the captured workload includes values that are returned by the SYS_DATE function. For example, in one embodiment, the capture logics 110A-110M capture date and time-of-day values that are returned by functions that the production database server 108 evaluates. In one embodiment, the capture logics 110A-110M capture every value that is generated or returned by the functions discussed above.

In one embodiment, the captured workload additionally includes database link activity, JAVA Sockets activity, and data that results from the interaction of the production database server 108 with other systems.

Capture Logics

In one embodiment, the production database server 108 (and, more specifically, the capture logics 110A-110M only capture workload while production database server 108 is configured, by a user, to operate in an "continuous capture mode." As described below with respect to FIG. 2, a database administrator might place production database server 108 into continuous capture mode via a command communicated through a database administrator interface (e.g., interface logic 222 of FIG. 2). In one embodiment, a database administrator also specifies, through such an interface, a location of the circular workload buffer 114. Recall that the workload buffer may be an allocation of SGA memory that is accessible to all the processes that write to the production database workload. The capture logics 110A-110M store captured workload into the specified location.

Beneficially, when the capture systems and techniques described herein are used, database server-external processes do not need to be established to perform the capturing tasks. Such external processes might otherwise reduce the stability of the production system (i.e., the production database server 108 and the production database 112). Additionally, the capture systems and techniques described herein can be applied to parallel database environments in which multiple production database server instances, which may execute on multiple separate hosts or machines, all serve the same database (e.g., production database 112). In one embodiment, whenever any production database server instance that serves a particular database is put into continuous capture mode, all of the production database server instances that also serve the particular database are also automatically put into continuous capture mode. Each database server instance records the workload that is received and served by that database server instance.

Because the capture logics 110A-110M are a part of the production database server 108, the production database server 108 itself captures workload. Because production database server 108 is the entity that performs the capturing task (rather than some external entity), the information stored in captured workload is highly accurate. In contrast, capturing workload outside of production database server 108 would be error-prone and subject to inaccuracies; capture entities operating outside of production database server 108 would not have access to all of the information to which production database server 108 has access. For example, the production database server 108 has access to transactional information (e.g., SCNs) to which server-external entities do not necessarily have access. Because such transactional information can be used to ensure a transactionally consistent replay, the capture and replay system described herein can produce a more complete workload capture and replay than other systems that do not have access to transaction information that is typically unavailable outside of a database server.

Additionally, in one embodiment, because the production database server 108 already has interfaces on various different platforms for sophisticated features such as asynchronous I/O, buffered I/O streams, and data compression libraries, the workload capture and replay system described herein is able to benefit from these features to make workload capture highly efficient. Because the workload is captured within a production system that might need to exhibit high performance characteristics even during the recording interval, the workload capture should affect only as minimally as possible the performance of the production system.

In continuous capture mode, the captured workload is stored in the circular workload buffer 114 in volatile memory and is not written to disk or other non-volatile memory immediately, if ever. When the in-memory workload buffer 114 becomes full, the oldest contents of the workload buffer 114 are automatically overwritten. In one embodiment, the contents of the workload buffer 114 may be periodically (e.g., every workload interval to capture continuous workload) "pushed" or written asynchronously to disk or other non-volatile memory. In one embodiment, an event management system may, in response to detecting a critical event such as a database system malfunction, trigger a push of the contents workload buffer 114 to disk. In the absence of a critical event, the contents of the workload buffer are simply overwritten. This reduces the frequency of disk accesses and reduces the amount of memory used to store "uninteresting" workload. When it is performed, the pushing of the buffer to disk may be performed asynchronously so that the production system can continue with other operations while the pushing takes place rather than waiting for the disk access to complete.

Capture Filters

In one embodiment, the capture logics 110A-110M are optionally configurable to "filter" the workload that is stored in the workload buffer 114 so that only certain user-specified kinds of workload (e.g., only workload whose attributes and characteristics satisfy specified filter criteria) are stored in the workload buffer 114. For example, the capture logics 110A-110M may be configured to capture only workload that originates from a selected subset of the clients 104A-N.

For another example, the capture logics 110A-110M may be configured to capture only workload that originates from a selected subset of application servers 106A-L. For yet another example, capture logics 116A-116M may be configured to capture only workload that targets or applies to a selected subset of relational structures (e. g., relational tables) within production database 112.

Pre-Processing Captured Workload Prior to Replay

In one embodiment, after the capture logics 110A-110M have captured workload, but before the captured workload stored in the workload buffer 114 can be replayed to replay database server 118, various dependencies in captured workload might need to be discovered. For example, transactional dependencies and data dependencies might need to be discovered. In one embodiment, before captured workload is replayed to replay database server 118, data structures that represent these dependencies are generated within the captured workload.

In one embodiment, the pre-processing that involves the generation of these structures is performed "off-line" relative to the capture and replay processes. In one embodiment, the information that is placed within these structures indicates the order in which the various files of the captured workload need to be replayed. In one embodiment, the information that is placed within these structures includes a dependency graph that indicates the order in which sets of workload units should be replayed in order to duplicate the workload that the production database server 108 received during the workload interval. In one embodiment, connection strings that the application servers 106A-106L used to connect to the production database server 108 during the workload interval are placed within these structures so that driver logics 116A-116K can re-create these connections relative to replay database server 118 during replay.

Replay Mode

In one embodiment, the replay database server 118 uses at least some of the additional information (e.g., SCNs, server-generated values, etc.) contained in the captured workload to perform operations relative to replay database 120. In one embodiment, the replay database server 118 is configurable to operate in a special non-normal mode called "replay mode." In one embodiment, while the replay database server 118 is in replay mode, instead of generating its own SCNs and server-generated values for use in performing operations relative to the replay database 120, the replay database server 118 uses the SCNs and server-generated values that are associated with the workload units in captured workload. Among other uses, the replay database server 118 uses this information to coordinate separate transactions that are specified in the captured workload.

In one embodiment, while the replay database server 118 is in replay mode, the replay database server 118 reads the additional information (e. g., SCNs, server-generated values, etc.) directly from the captured workload in the workload buffer 114. In such an embodiment, the replay database server 118 does not need to obtain this additional information from the driver logics 116A-116K, and the driver logics 116A-116K do not need to send this additional information to the replay database server 118. In such an embodiment, driver logics 116A-116K may send, to the replay database server 118, workload that only specifies as much information as was present in the workload that the production database server 108 originally received, prior to processing any of that workload. However, even in such an embodiment, driver logics 116A-116K may retain the responsibility of ensuring that the intervals of time that pass between the times that specific workload units are sent to replay database server 118 are the same as the intervals of time that passed between the times that those workload units were received by production database server 108 at capture time.

Placing the burden of transaction coordination on the replay database server 118 instead of driver logics 116A-116K allows a "thinner" implementation of driver logics 116A-116K, in one embodiment. In one embodiment, each of driver logics 116A-116K is responsible for replaying a separate subset of captured workload to the replay database server 118. In such an embodiment, driver logics 116A-116K are responsible for properly ordering and timing the sending of the workload units that are in the subsets for which they are responsible, but the driver logics 116A-116K are not responsible for properly ordering and timing the sending of any workload units that are in any subsets for which they are not responsible. Global coordination between workload that different driver logics 116A-116K send may be handled by the replay database server 118 while the replay database server 118 is in replay mode.

Replay Timing

In one embodiment, whenever the capture logics 110A-110M intercept a workload unit that the production database server 108 received, the capture logics 110A-110M record the time at which production database server 108 received that workload unit. The capture logics 110A-110M store a timestamp, which indicates this time, in association with the workload unit in the workload buffer 114. In one embodiment, during workload replay, whenever driver logics 116A-116K read, from the workload buffer 114, a particular workload unit that is associated with a timestamp, the driver logics 116A-116K determine the difference between (a) the time indicated by that timestamp and (b) the time indicated by the timestamp that is associated with the workload unit that driver logics 116A-116K most recently sent to replay database server 118. The driver logics 116A-116K wait to send the particular workload unit to the replay database server until a time represented by the difference has passed since the time that driver logics 116A-116K sent the most recently sent workload unit to the replay database server 118.

Thus, in one embodiment, the amount of time that passes between the production database server's receipt of consecutively received workload units determines the amount of time that will pass between the test database server's receipt of those workload units. For example, if production database server 108 receives a first workload unit and then receives a second workload unit two minutes later, then, when driver logics 116A-116K replay the first and second workload units to the replay database server 118, the replay database server

118 also will receive the second workload unit two minutes after receiving the first workload unit.

In one embodiment, the driver logics 116A-116K can be configured, optionally, to ignore the timing information that is presented in captured workload stored in the workload buffer 114. When this timing information is ignored, the driver logics 116A-116K replay captured workload to the replay database server 118 as rapidly as possible.

In one embodiment, there are three separate replay modes from which a user can choose for replaying captured workload to replay database server 118. As is discussed above, in one mode, the workload units are replayed at the same time intervals, relative to each other, as they were originally "played" or received at capture time. Also as is discussed above, in one mode, the workload units are replayed as fast as possible, without regard to any time that passed between the original receiving of those workload units at capture time.

In a third mode, called "auto replay" mode, the driver logics 116A-116K seek to honor and replicate the inter-workload unit time intervals, similar to the first mode described above, but also allow inter-workload unit replay time intervals to be shortened when the replay of previous workload units has taken longer than the original "play" or receipt of those workload units took during capture time. In a sense, this "auto replay" mode allows the driver logics 116A-116K to "catch up" when the replay of some workload units has taken longer than expected.

For example, at capture time, a first workload unit might be received at the production database server 108, and then a second workload unit might be received a minute later, and then a third workload might be received a minute after that. Continuing the example, at replay time, the first workload unit might take a minute and thirty seconds to be processed-longer than the expected minute. Under such circumstances, the driver logics 116A-116K might replay the second workload unit one minute and thirty seconds after the replaying of the first workload unit. However, rather than waiting an additional minute after the replaying of the second workload unit to replay the third workload unit, the driver logics 116A-116K might "catch up" by replaying the third workload unit only thirty seconds after the replaying of the second workload unit. As a result, even though the replaying of the second workload unit was delayed, the third work load unit will still be replayed two minutes after the first workload unit, similar to the timing that occurred at capture time.

In one embodiment, driver logics 116A-116K can be configured to replay workload units to the replay database server 118 at various user-specified speeds. In one embodiment, the "default" rate or speed at which the driver logics 116A-116K replay workload units is based on the rate or speed at which those workload units were originally received at the production database server 108. However, in one embodiment, by interacting with an interface either during configuration or replay, a database administrator can change (a) the duration of the time intervals between the replaying of workload units from a same database connection and/or (b) the amount of time that passes when a new database connection is established. Thus, in one embodiment, a database administrator can selectively accelerate or decelerate the replay to be faster or slower than the rate or speed at which the workload units originally were processed in the production system at capture-time.

Monitoring and Reporting

In one embodiment, the replay logic 115 also includes a monitor logic 126. The monitor logic 126 allows a user to monitor the capture and/or replay of workload. For example, the monitor logic 126 may present, to a user, real-time performance information (e.g., response time) pertaining to the processing of the workload during capture and/or replay. For another example, the monitor logic 126 may present, to a user, real-time information that indicates errors that were encountered during capture and/or replay. A user might use such information to diagnose problems in the production system.

In one embodiment, at the conclusion of the replay process, the monitor logic 126 outputs (e.g., to a file) reporting information that indicates fine-grained performance information, errors, and statistics relating to specific user-selected sets of workload units (e.g., SQL commands) in which the user is particularly interested. A database administrator may use this fine-grained information to diagnose problems in the production system.

Some workload units that the production database server 108 receives might specify invocations of database functions that return database server-generated values (i.e., values that the database server generates without regard to any data stored in the database on which the database server operates). For example, in one embodiment, invocation of the NEXTVAL function returns the value that occurs, in a sequence of values, immediately after the value that was returned by the most recent invocation of the NEXTVAL function in the same session (alternatively, NEXTVAL returns the first value of that sequence if NEXTVAL was not previously invoked in that session). For example, if the most recent invocation of the NEXTVAL function in a particular session returned the value "2," then the next invocation of the NEXTVAL function in that session returns the value "3."

In one embodiment, in order to ensure that the values returned by such functions are preserved and duplicated when the workload is replayed on the replay database server 118, whenever the capture logics 110A-110M determine that an intercepted workload unit specifies an invocation of such a function (e.g., CURRVAL, NEXTVAL, etc.), the capture logics 110A-110M obtain the actual value that is returned by the invocation of that function. As is discussed above, the capture logics 110A-110M may be implemented within the code of the production database server 108. Thus, in one embodiment, the production database server code that implements the sequence generation functions (e.g., CURRVAL, NEXTVAL, etc.) comprises functionality that captures and stores the values generated by these functions when these functions are executed.

The capture logics 110A-110M store the actual value in association with the workload unit in captured workload. In such an embodiment, during the replay of the workload to replay database server 118, replay database server 118 modifies workload units that specify an invocation of such a function so that the actual values associated with those work load units replace the invocation of the function. For example, at replay time, a SQL statement (workload unit) that invokes function CURRVAL might be modified by the replay database server 118 such that, in the modified SQL statement, CURRVAL is replaced by the actual value that the invocation of CURRVAL returned (as indicated in the captured workload stored in the workload buffer 114) in the production system at capture time.

As a result, when replay database server 118 processes (i.e., executes) the workload unit at replay-time, replay database server 118 processes the workload unit with the same values with which production database server 108 processed that workload unit at capture-time. Although the description above refers specifically to the NEXTVAL function, similar techniques may be used in connection with other database functions that return database server-generated values. For example, in one embodiment, whenever the capture logics 110A-110M determine that an intercepted workload unit specifies an invocation of a function that returns the current date and/or time of day, the capture logics 110A-110M obtain the actual current date and/or time of day that is returned by the invocation of that function. The capture logics 110A-110M store the actual current date and/or time of day in association with the workload unit in captured workload.

In such an embodiment, during the replay of the workload to the replay database server 118, the replay database server 118 modifies workload units that specify an invocation of such a function so that the date and/or time of day associated with those workload units replace the invocation of the function. Thus, even if the driver logics 116A-116K replay such a workload unit on a different date and/or at a different time of day than that at which the workload unit was originally captured, the workload unit will reflect the originally captured date and/or time of day rather than the date and/or time of day at which the workload unit is replayed.

User-Defined Substitutions

Typically, when one of application servers 106A-106L needs to transact with production database server 108, that application server first needs to establish a connection with the production database server 108. In order to establish this connection, the application server usually needs to have and use a specified set of detailed information, such as the identity of the machine on which the production database server 108 is executing, the port number that will be used in the connection, the protocol according to which data will be communicated over the connection, etc. Such information is often contained in "connection strings," which are usually embedded somewhere within workload.

The replay database server 118 cannot be connected to using the same connection strings that are used to connect to production database server 108. If the driver logics 116A-116K replay a workload unit that specifies a connection string that was used to connect to the production database server 108, then subsequent workload units that the driver logics 116A-116K replay might be directed, unintentionally, to the production database server 108 rather than replay database server 118. To prevent this and other similar types of accidents from happening, in one embodiment, a user can specify a set of capture-time values and a corresponding set of associated replay-time values. In such an embodiment, of the invention, a registration component of the replay logic 115 receives the user-specified set of capture-time and replay time values from the user and stores mappings between those values in a registry that is stored in the workload buffer. In such an embodiment, whenever any one of the driver logics 116A-116K reads, from captured workload, a workload unit that contains a value that is in the registered user-specified set of capture-time values, or a variable that was bound to such a value, that the driver logic replaces the capture-time value or the variable in the work load unit with the registered user-specified replay-time value that is mapped to that capture-time value. The driver logic then sends the modified workload unit to the replay database server 118.

Because connection strings can be remapped in the above manner, workload can be captured within a production system that includes a single database server, but replayed within a replay system that includes multiple database server instances that all perform operations relative to the replay database 120 (e.g., as in a Real Application Cluster). This may be accomplished, for example, by remapping all of the connection strings so that driver logics 116A-116K send replayed workload units to a load-balancing service that distributes the workload units among the multiple database server instances in the test system. Although the discussion above refers specifically to the substitution of connection strings, the same substitution mechanism may be applied to kinds of data other than connection strings also. For example, database links, file system links, and/or URLs may be automatically substituted in replayed workload units using the techniques described above.

Maintaining Transactional Consistency in Replay

In one embodiment, among other information that is captured during the recording interval, information about the "transactional environment" for each workload unit is captured and stored in conjunction with that workload unit. Each SQL command may execute in the context of a transactional environment. The transactional environment in which a SQL command executes dictates which database state the SQL command "sees."

For example, in a transactional database system, the client 104A might issue, to the production database server 108, SQL commands in the context of a first transaction at the same time that client 104B issues, to production database server 108, SQL commands in the context of a second transaction. The first transaction might include an SQL command, "INSERT INTO T1 VALUES CA!" The second transaction might include an SQL command, "SELECT*FROM T1." This "SELECT" command might execute after the "INSERT" command has been executed. Under such circumstances, the "SELECT" command in the second transaction should not see the insertion of the value "A" into table "T1" unless the first transaction has been committed. If the "SELECT" command executes before the first transaction has been committed, then the "SELECT" statement should not see the first transaction's effects on table "T1."

To ensure that no transaction should see the effects of another transaction that has not yet committed, an SCN is assigned to each workload unit. For example, an SCN may be assigned to each SQL command. Each SCN reflects the transaction environment in whose context the corresponding workload unit should be processed. In one sense, each SCN signifies a "snapshot" of the database state. Recall that an SCN is a logical time value that reflects the state of the database that should be visible to the corresponding command when that command is executed or otherwise processed. In one embodiment, higher SCNs indicate later-occurring database states than are indicated by the lower SCNs that precede them. However, it is possible for multiple workload units to have the same SCNs.

As already discussed, in one embodiment, these SCNs are included in the workload that is captured by capture logics 110A-110M for use by the replay database logic 122 in configuring the replay database 120. When driver logics 116A-116K replay captured workload to the replay database server 118, the replay database server 118 uses the SCNs contained within the workload to ensure transactional consistency. Referring to the example discussed above, if the "SELECT" command of the second transaction was unable to see the effects of the first transaction when the "SELECT" command was executed relative to the production database server 108, then the presence of the SCNs in the replayed workload causes the replay database server 118 to ensure that the "SELECT" command also will be unable to see the effects of the first transaction when the "SELECT" command is executed relative to the replay database server 118. When the replay database server 118 receives a workload unit that is associated with an SCN, replay database server 118 abides by the SCN that is indicated in that workload unit instead of assigning a new SCN to that work load unit.

Although the above description refers to the user of SCNs specifically, various embodiments of the invention may, alternatively, utilize other kinds of transaction environment identifiers whose function and purpose is to represent database state and to ensure transactional consistency between multiple concurrently executing transactions. In one embodiment, all workload units are categorized as being either "commit actions" or "non-commit actions." Any workload unit whose execution causes an entire transaction's effects on a database to be made persistent (i.e., "committed") in that database is a commit action. All other workload units are non-commit actions. The results that are obtained from the execution of a non-commit action depend on the commit actions that have been executed prior to that non-commit action.

In one embodiment, when the production database server 108 receives a workload unit, the production database server 108 assigns, to that workload unit, the "current" SCN. For example, if the "current" SCN is "90" at the time that the production database server 108 receives a workload unit, then the production database server assigns, to that workload unit, an SCN of 90. This is true for both commit and non-commit actions. However, in one embodiment, commit actions are associated with two separate SCNs: the "pre SCN" that is assigned to the commit action when the production database server 108 receives the commit action, and another "post-SCN" that is assigned to the commit action when the production database server 108 finishes executing the commit action.

Typically, production database server 108 increases the "current" SCN whenever the production database server finishes executing a commit action. A significant amount of database activity may occur in between the time that production database server 108 receives a particular commit action and the time that the production database server finishes executing that particular commit action. As a result, the "current" SCN that is assigned to the commit action when that commit action is done executing may be higher than the SCN that was assigned to the commit action when production database server 108 receives that action. Thus, a particular commit action's pre-SCN may differ from that particular commit action's post-SCN. In one embodiment, the capture logics 110A-110M include, in the captured workload, both of the SCNs that are assigned to each commit action. The presence of the post-SCN in captured workload allows the replay database server 118 to determine the value to which the replay database server's "current" SCN should be set after the execution, during replay-time, of a commit action with which that post-SCN is associated.

Commit actions are not limited to actual SQL commit statements. Commit actions may include, for example, entire PL/SQL blocks that contain any SQL commit statement. In one embodiment, a PL/SQL block that contains at least one SQL commit statement is treated as a single commit action. Additionally, data definition ("DDL") statements (e.g., "CREATE TABLE," "DROP TABLE," "ALTER TABLE," etc.) commands are treated as commit actions.

In one embodiment, the SCNs that are included in the captured workload are used during the pre-processing activities (discussed above) that are performed prior to replay-time. In one embodiment, a dependency graph, which indicates the order in which various workload units need to be executed relative to each other, is built at pre-processing time based on the SCNs that are associated with those workload units. The dependency graph is considered a part of the captured workload. The replay logic 115 uses this dependency graph during replay-time to ensure that workload units are executed in a transactionally consistent manner.

In one embodiment, the dependency graph is a directed graph in which separate workload units are represented by separate nodes. Each node in the dependency graph may be connected to one or more other nodes by directional links. Links can be incoming or outgoing. A link incoming to a node indicates that the node's workload unit cannot be executed before the workload unit of the node from which that link comes. A link outgoing from a node indicates that the node's workload unit needs to be executed before the workload unit of the node to which that link goes. In one embodiment, the dependency graph is constructed in such a way that the use of the graph ensures that, for each commit action represented by a node in the graph, the replay database server 118 will not execute, before that commit action, any workload unit that has an SCN that is greater than the pre-SCN of that commit action. Thus, when the dependency graph is constructed, each node that represents a workload unit that has an SCN that is greater than the pre-SCN of a particular commit action will be placed somewhere "downstream," link-wise, of the particular commit action's node in the dependency graph. This technique is called "commit point ordering."

In one embodiment, before the replay database server 118 executes a particular workload unit during replay time, the replay database server consults the dependency graph and determines whether the workload units of all other nodes that are "upstream," link-wise, of the particular workload unit's node in the dependency graph already have been executed relative to the replay database 120. The replay database server 118 does not execute the particular workload unit unless the workload units of all other nodes that are "upstream," linkwise, of the particular workload unit's node in the dependency graph already have been executed relative to the replay database 120. In one embodiment, whenever the replay database server 118 executes a workload unit, the replay database server marks that workload unit's node in the dependency graph to indicate that the workload unit has been executed.

In one embodiment, whenever the replay database server's "current" SCN increases during replay time (e. g., in response to the execution of a commit action by the replay database server 118), the replay database server 118 determines, based on a comparison of the "current" SCN with the SCNs of the yet-unexecuted workload units that the replay database server has received, which of those workload units the test database server can now execute. In one embodiment, the replay database server 118 proceeds to execute each such workload unit that is associated with an SCN that is not greater than the "current" SCN. In one embodiment, whenever the replay database server 118 executes a commit action, the replay database server sets the "current" SCN to the value of that commit action's post-SCN in the execution of non-commit actions does not cause the replay database server to increase the replay database server's "current" SCN.

Each workload unit should "see" the proper state of the replay database 120 when the replay database server 118 executes that workload unit. For each workload unit, the state of the replay database 120 that the workload unit should "see" when executed is the state that corresponds to the post-SCN of the commit action represented by the node from which that workload unit's node directly depends in the dependency graph. Therefore, in one embodiment, whenever the replay database server 118 is going to execute a non-commit action, the replay database server 118 first determines the post-SCN of the commit action that is immediately "upstream," link-wise, of that non-commit action. The replay database server 118 executes the non-commit action in the context of the database state, or "environment," that is indicated by the post-SCN of that commit action (rather than the SCN of the non-commit action). This ensures that the workload unit will not "see" data that should persistently exist only in some future (relative to the workload unit) database state that the workload unit ought not to be able to "see." The workload unit will not "see" any data that was committed in the replay database 120 after the immediately "upstream" commit action.

Dependent SCN

When two separate transactions T1 and T2 are concurrently executing relative to production database 112 during capture-time, SQL UPDATE statements in both T1 and T2 might target the same data block in the production database. Under such circumstances, the first transaction whose UPDATE statement is executed (which may depend on the speed of the CPUs that are processing the transactions) obtains a lock on the data block so that the other transaction cannot perform its UPDATE operation until the first transaction has released the lock. The first transaction does not release the lock until the first transaction has committed. Thus, the other transaction will be forced to wait until the first transaction has committed before that other transaction can complete.

After the first transaction has released the lock, the other transaction obtains the lock on the data block, performs its UPDATE operation, and then commits. Under such circumstances, the state of the database after both transactions have committed may depend on the order in which transactions T1 and T2 committed, which is based on the order in which transactions T1 and T2 obtained the lock. When the same transactions T1 and T2 are concurrently replayed relative to the replay database 120, differences between the production system and the test system might cause the transaction that obtained the lock first during capture-time to obtain the lock last during replay-time. As a result, during replay time, the transactions might commit in a different order than the order in which those transactions committed during capture-time. If no compensation is made for this situation, then the concurrent replay of transactions T1 and T2 might produce significantly different effects relative to the replay database 120 than the original concurrent execution of those transactions produced relative to production database 112. The authenticity of the replay may be compromised.

In order to overcome the difficulties that such situations might present, in one embodiment, each workload unit is assigned at least two separate SCNs: a "statement" SCN and a "dependent" SCN. The "statement" SCN is the SCN that is discussed above, which is the production database server's "current" SCN that is assigned at the time that production database server 108 receives the workload unit during capture-time. The "dependent" SCN is the post SCN of the commit action for whose completion the workload unit had to wait before executing at capture-time, if the workload unit had to wait. The capture logics 110A-110M include both SCNs for each workload unit in the captured workload.

For example, at capture-time, if the production database server 108 receives a particular workload unit (e. g., an SQL UPDATE statement) in transaction T2 when the production database server's "current" SCN is "40," then the particular workload unit's "statement" SCN is "40." If the execution of the particular workload unit is forced to wait until a particular commit action in concurrently executing transaction T1 finishes, then the particular workload unit's "dependent" SCN is the post-SCN of the particular commit action. If the particular commit action's post-SCN is "50," then the particular work load unit's "dependent" SCN is also "50." In one embodiment, during capture-time, whenever the execution of a workload unit is forced to wait for a commit action in another transaction to finish, the production database server 108 sets that workload unit's "dependent" SCN to the post-SCN of that commit action at the time that the commit action finishes.

In one embodiment, each lock identifies the transaction that last released that lock. Thus, when a workload unit obtains a lock after being forced to wait for that lock, that workload unit may determine which other transaction last released the lock, and may determine, from transaction tables, the post-SON of the commit action that committed that other transaction. However, there are a variety of different techniques through which the correct "dependent" SCN might be determined for a given workload unit; the foregoing is merely an example of one of the many different techniques that might be employed.

A workload unit might need to wait for several different locks to be released (possibly by other workload units in multiple other concurrently executing transactions) before that workload unit can execute. Under such circumstances, the workload unit's "dependent" SCN might be updated several times as the workload unit eventually obtains each of the locks. The workload unit's "dependent" SCN ultimately will contain the value to which the workload unit's "dependent" SCN was last updated, and will reflect the post-SCN of the commit action that finished last among those on which the workload unit's execution was waiting.

In one embodiment, workload unit's "dependent" SCNs are used at replay-time to at least partially determine the order in which the replay database server 118 should execute those workload units relative to each other. In one embodiment, during replay-time, whenever the replay database server 118 receives a workload unit that is associated with a "dependent" SCN, the replay database server refrains from executing that workload unit until the test database server's "current" SCN is at least as great as the workload unit's "dependent" SCN. As a result, if production database server 108 committed a first workload unit in transaction T1 before executing a second workload unit in a concurrently executing transaction T2 at capture-time, the replay database server 118 will not execute the second workload unit at replay-time until after the replay database server has committed the first workload unit, even if the replay database server receives the second workload unit before the first workload unit. As a result, the authenticity of the replay will be preserved.

Client-Driven Replay

As is discussed above, in one embodiment, the driver logics 116A-116K send workload units that are in the captured workload to the replay database server 118. Thus, the replay database server 118 may process those workload units in the same manner as the replay database server 118 would have processed those workload units if they had been sent by applications servers 106A-N and/or clients 104A-N instead. The existence of driver logics 116A-116K makes it unnecessary to duplicate the application servers 106A-N and the clients 104A-104 N in the continuous capture database system (e.g., the replay logic 115, the capture logics 110A-110M, the driver logics 116A-116K, the replay database logic 122, the replay database server 118, and the replay database 120). In one embodiment, each workload unit that is replayed is equivalent to the original workload unit that was captured in the production system in terms of the way that the workload unit affects database state, end results, and server component usage.

In one embodiment, the temporal characteristics of concurrent workload units are maintained so as to keep the same concurrency relative to the replay database server 118 and the replay database 120 during replay.

Driver logics 116A-116K can be deployed easily. In one embodiment, each of the driver logics 116A-116K is implemented identically. For example, each of the driver logics 116A-116K may be a separate executing instance of the same program code (whereas, typically, application servers 106A-106L will not be similar to each other in this way). The number of driver logics 116A-116K that drive the replay may vary. For example, all of the workload units in stored in the workload buffer 114 may be replayed by a single driver logic 116A, regardless of the number of applications servers 106A-106L and clients 104A-104N. Alternatively, each of the driver logics 116A-116K may replay the workload units that were originally sent by a corresponding one of application servers 106A-N. There does not need to be a one-to-one correspondence between applications servers 106A-N and driver logics 116A-116K (although there can be). Thus, the replay system is scalable.

The replay is consistent in function, but not necessarily in form, with the original workload processing that occurred at capture-time. In one embodiment, the driver logics 116A-116K read all of the data from captured workload and, using reverse engineering, construct new calls that conform to OCI or a similar protocol. Such reverse engineering may involve, for example, extracting, from a workload unit, SQL text, bind values, SCNs, etc., and placing such information into an OCI call. Thus, the protocol used during replay may be independent of the protocol(s) (e.g., JDBC, ODBC, etc.) that were used by application servers 106A-N at capture-time. In one embodiment, this protocol exposes all of the available functionality of the replay database server 118. OCI can be used to reproduce the functionality of the calls of all other protocols. OCI allows non-SQL-based, non-cursor-based direct access to objects (e.g., LOBs) in a database. In one embodiment, driver logics 116A-N divide replay tasks among themselves.

In one embodiment, the driver logics 116A-116K automatically balance the workload unit among themselves so that each driver logic is sending approximately the same amount of data at approximately the same rate to the replay database server 118 at replay-time. Each of replay clients 116A-N may be multi-threaded so that replay clients 116A-116N can drive multiple "user streams," or "sessions," from which workload was captured during capture time. For example, a separate thread may be devoted to the replay of the workload units from each database session.

In one embodiment, the quantity of concurrently executing database server instances that perform operations relative to production database 112 differs from the quantity of concurrently executing database server instances that perform operations relative to the replay database 120. For example, regardless of whether there is one production database server instance or several production database server instances (e.g., as in a RAC), there may be one replay database server instance or several the replay database server instances.

In one embodiment, captured workload is replayed in such a way that connection patterns between application servers 106A-106L and the production data base server(s) are recreated between driver logics 116A-116K and the replay database server(s). For example, if two or more sessions explicitly used one common connection to production database server 108 at capture-time, then two or more sessions may similarly use one common connection to replay database server 118 at replay-time.

Driver logics 116A-116K may execute on the same machine or on separate machines. In one embodiment, each of driver logics 116A-116K maintains statistics concerning the workload units that the driver logic replays. For example, the statistics may indicate, for each replayed workload unit, any error messages that were generated as a consequence of the replaying of that workload unit relative to the replay system. Database system administrators may inspect such error messages and use the information gleaned from that inspection to troubleshoot the production database system.

In one embodiment, when a user wishes to utilize the continuous capture feature, the user accesses the replay logic 115. In one embodiment, the replay logic 115 comprises a continuous capture application associated with an enterprise manager and served by the application servers 106A-106L. The user is prompted, by a screen generated by an interface logic 222, to enter a logical point within the captured workload at which point she wants the replay to begin. The logical point corresponds to a point at or before which the production database experienced a first captured workload unit. The replay logic 115 provides a logical point to the replay database logic 122 and, in response, the replay database logic 122 generates a copy (e.g., reverts a backup copy or mirror database) of the production database in its condition at the logical point as described above. In one embodiment, the replay logic 115 supplies a first SCN in the workload buffer to the replay database logic 122 instead of or in addition to, the logical point.

The replay logic 115 is configured to access the time stamp information for captured workload units to determine if any of the workload units occurred before the logical point. If so, then the logical point occurred while workload units currently stored in the workload buffer 114 were executed on the production database system. In this case, the replay logic 115 causes the driver logics 116A-116K read the workload buffer 114 and locate the workload units that have a timestamp corresponding to, or just before, the logical point. The driver logics 116A-116K replay the captured workload stored in the workload buffer 114, from this starting point, on the replay database 120. The results of the replay are displayed, stored, and or used to generate reports by the monitor logic 126. Because the workload is stored in the workload buffer 114 which is in memory with respect to the replay logic 115, the replay can occur almost instantaneously.

The replay logic 115 is configured to access the time stamp information for captured workload units to determine if any of the workload units occurred before the logical point. If not, then the logical point occurred prior to when the earliest workload unit in the workload buffer 114 was executed by the production database system. In this case, the replay logic 115 retrieves workload units, starting from workload unit that was executed on the production database at the logical point, from offline storage 230 and stores the workload unit data in memory for access by the driver logics 116A-116K. This will involve one or more I/O operations and may also include decompressing the workload data. Once the workload data is present in memory, the replay logic 115 causes the driver logics 116A-116K read and replay the captured workload stored in the memory and the workload buffer 114 on the replay database 120. The results of the replay are displayed, stored, and/or used to generate reports by the monitor logic 126. Due to the additional I/O operations, a slight delay may be experienced by the user when seeking to replay workload beyond the workload interval stored in the workload buffer 114.

The replay logic 115 may provide additional features to a user. In one embodiment, the replay logic 115 will cause a replay screen to be displayed on which a user can actuate fast forward, pause, and/or rewind functions, similar to those found on many video playback devices. When the user selects one of these functions, the replay logic 115 controls the driver logics 116A-116K to change the speed with which the workload units are played to the replay database server 118. In embodiment, the user is prompted to select a playback mode from one of the playback modes described above. The replay logic 115 is configured to control the driver logics 116A-116K to replay the workload in the selected mode.

Figure 2:
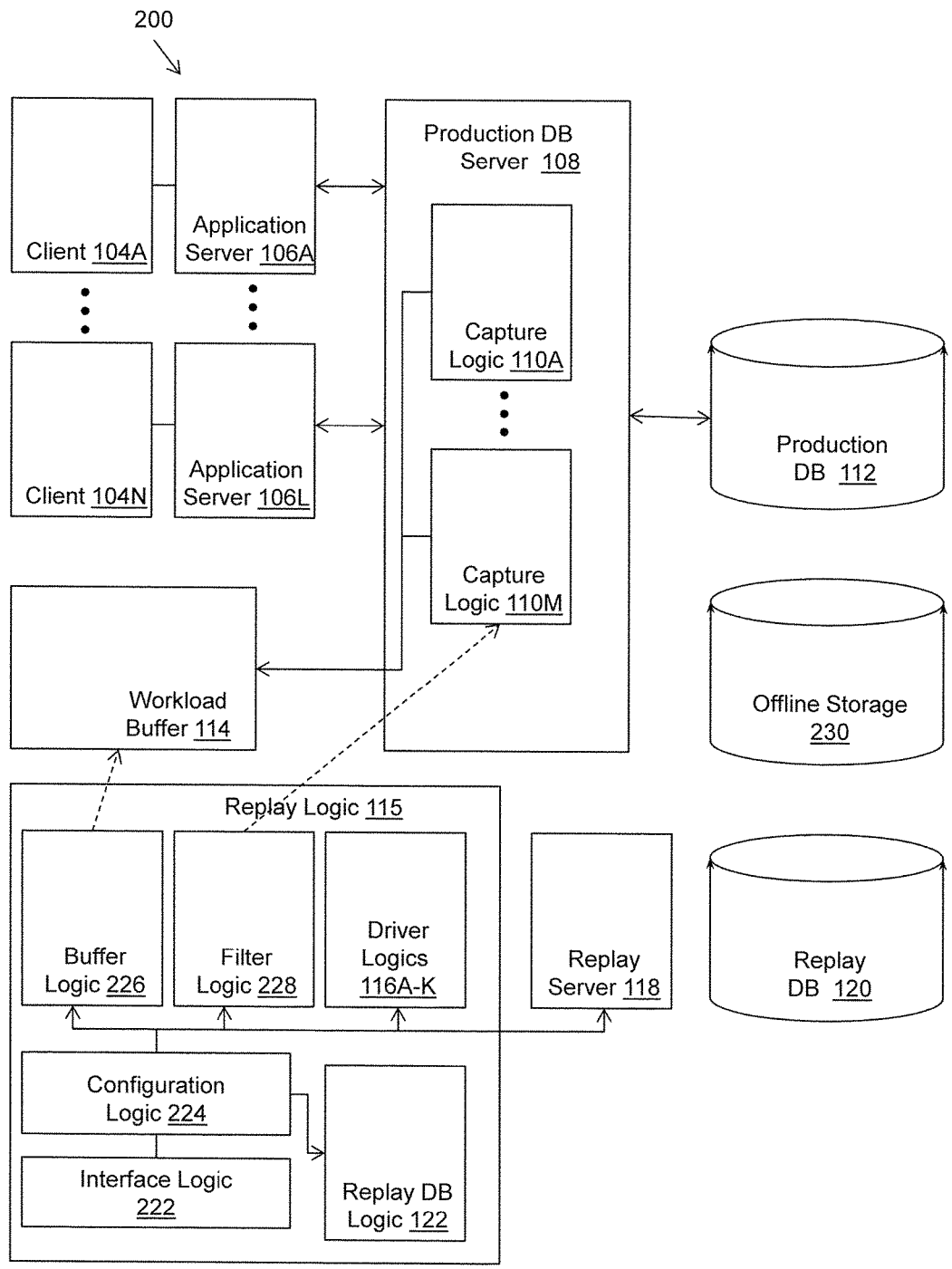
FIG. 2 illustrates another embodiment of a system associated with continuous capture of replayable workload for a database system.
Figure 3B:
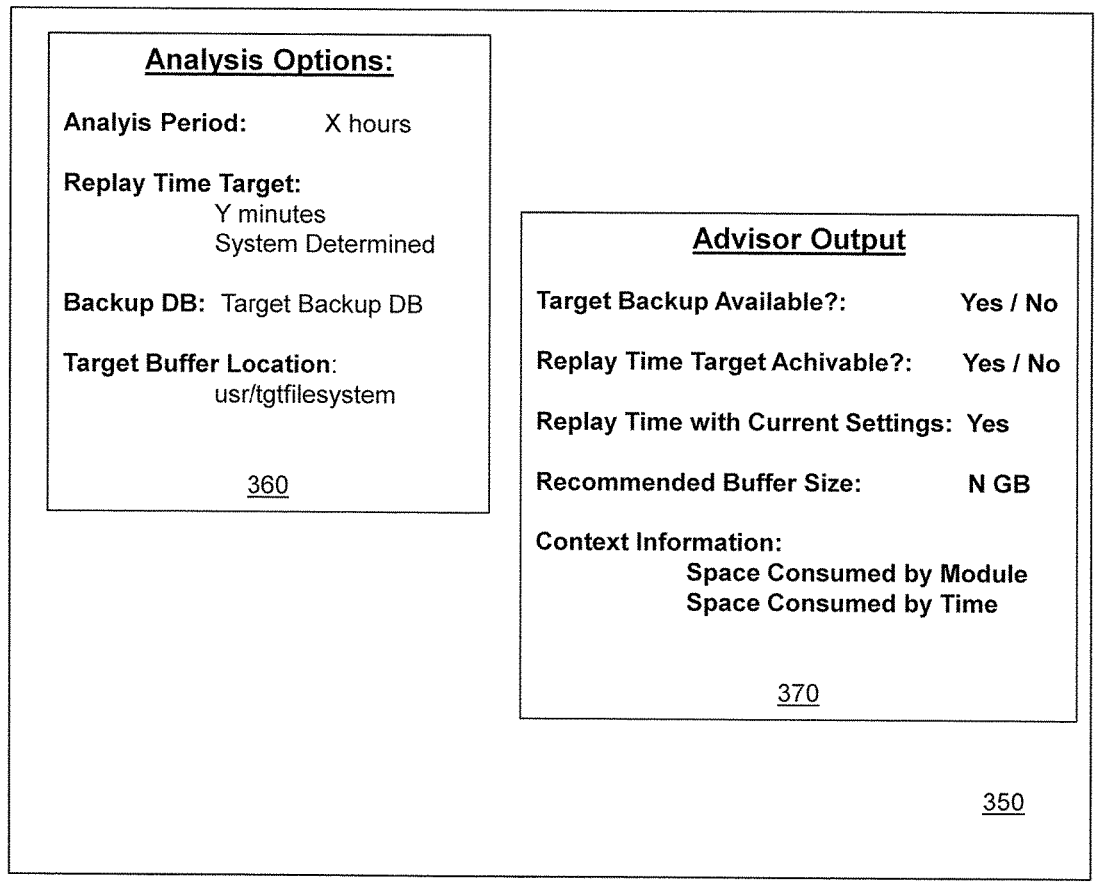

FIG. 2 illustrates an example embodiment of a database system 200 that provides a continuous capture feature. The replay logic 115 includes several logics that allow a user, such as a database administrator, to configure and use the continuous capture feature. Interface logic 222 is configured to provide prompts for and collect configuration data from the database administrator. The interface logic 222 may be a server side application that renders pages for and receives data from a web-based client, such as the clients 104A-104N. An example screen shot that is rendered by one embodiment of the interface logic is illustrated in FIGS. 3A and 3B, and will be described in more detail below.

In one embodiment, the interface logic is a single user interface page that is used to determine default capture and replay inputs such as: workload buffer location and space budget (e.g., 300 GB, 500 GB, and so on), minimum replay workload interval (e.g., last 30 minutes, last 50 minutes, and so on), capture logic settings to target specific kinds of workload, replay system configuration (e.g., use an active Data Guard system or alternate system configuration for replay), replay parameters (e.g., connect time, think time, synchronization, and so on), client workload machine set up, workload buffer location to be accessed by replay clients, and/or replay reporting parameters. In one embodiment, the various parameter settings and selections that may be made by the user will have some default value already stored. For example, the default for the capture logic settings may be to have the capture logics 110A-110M capture all of the workload, regardless of type.

The interface logic 222 provides configuration data collected from the user to a configuration logic 224. The configuration logic 224 is capable of interacting with various other logics in the database system 200 to set parameters, select functional options, and/or enable or disable various functions of the database system to implement the selections and settings conveyed by the configuration data received from the user by way of the interface logic 222.

The configuration logic 224 interacts with buffer logic 226, filter logic 228, the driver logics 116A-116K, the replay database server 118, and the replay database logic 122. The buffer logic 226 is configured to control aspects of the workload buffer 114. The buffer logic 226 allocates memory that will be used for the workload buffer 114. In one embodiment, the buffer logic 226 declares a range of memory addresses that provide the desired amount of memory in database system memory as a shared global area (SGA). This allows all of the processes that write to the workload (e.g., provide commands to the production database 112) to also write to the workload buffer 114. In one embodiment, the memory allocated as the workload buffer is "in-memory" with respect to the processes that write to the workload such that an I/O operation is not necessary for the processes to write to the workload buffer 114.

In one embodiment, the buffer logic 226 provides an advisor feature that determines the amount of memory that should be allocated to guarantee a requested replay time or workload interval. For example, a user interacting with the interface logic 222 may request a minimum of 30 minutes of replay time, meaning that at any given time, the user wants to be able to replay the last 30 minutes of workload that was experienced by the production database 112 on the replay database 120. Depending on the usage level experienced by the production database 112, the number of workload units executed by the production database server 108 on the production database 112 during any given 30 minute period may vary significantly, resulting in different amounts of memory being necessary to store the workload units for a 30 minute period.

The advisor feature accesses historical performance data for the production database system to identify a highest rate at which the production database experiences workload units during heaviest workload conditions. The advisor feature then calculates the amount of memory that would be required to store workload units, occurring at the highest rate, for the duration of the replay time. The advisor feature recommends allocating the calculated amount of memory, possibly increased by some safety margin, to the user allocating the workload buffer 114. This means that in many circumstances (e.g., when less than the heaviest workload is experienced) the workload units stored in the workload memory may provide more than the requested replay time.

In one embodiment, the advisor feature also provides a historical perspective of how quickly commands are being processed by the production database system. For example, the advisor feature may provide a workload context that includes a listing of workload units that were processed by the production database system during a certain workload interval so that the user can evaluate whether 30 minutes, 50 minutes, or any other period will be adequate to capture enough data to diagnose problems with the production database system. In one embodiment, the advisor is implemented in the server side on production metrics and statistics that are exposed in Enterprise Manager. The metrics and statistics include information such as a rate of workload generation and also expose workload stored in an automatic workload repository (AWR), which can be used for historical analysis.

In one embodiment, the buffer logic 226 is configured to interact with an enterprise manager event management system (not shown) to automatically periodically export the contents of the workload buffer 114 to offline storage 230. The automatic export may be triggered when a certain amount of "new" workload has been captured, meaning that the earliest workload units in the new workload is about to be overwritten. In this manner, the captured workload can be stored offline before being overwritten, allowing for the replaying of workload that occurred before the workload presently in the workload buffer 114. The offline storage 230 may comprise memory used for enterprise manager system backups, which is compressed and optimized for efficient storage. Use of the periodic export of captured workload allows the system 200 to replay of any period of workload experienced by the production database system.

In one embodiment, the buffer logic 226 is configured to interact with the enterprise manager event management system to configure critical database system events that will trigger automatic export of the contents of the workload buffer 114 to some specified memory. The user may use the interface logic 222 to specify which events, such as significant performance degradation, a particular error message, hardware failure, and so on trigger the exporting of the contents of the workload buffer. In this manner, the user does not need to "catch" the occurrence of a problem in the production database system when it happens to replay the immediately preceding workload and diagnose the problem.

In one embodiment, the buffer logic 226 implements the automatic export as part of an automatic response to critical errors in a process provided by the database system. The automatic response typically includes gathering of diagnostic data. The automatic response can be configured to include the automatic export of the workload buffer contents. In one embodiment, the buffer logic 226 implements the automatic export as part of a corrective action for critical errors. Enterprise Manager provides corrective actions, which are post error triggers. The corrective action can be configured to include the automatic export of the workload buffer contents.

The filter logic 228 is configured to interact with the capture logics 110A-110M to allow a user to select which types of workload units should be captured. In this manner only certain user-specified kinds of workload (e.g., only workload whose attributes and characteristics satisfy specified filter criteria) are stored in the workload buffer 114.

As discussed above, the captured workload includes five main kinds of information: SQL and PL/SQL workload, non-SQL workload, transactional data, call (workload unit) context, and special function instrumentation. In one embodiment, the user, through the interface logic 222, provides selections for which kind(s) of workload information is to be captured by the capture logics 110A-110M. The filter logic 228 is configured to adapt the capture logics 110A-110M to effect the user's selections. For example, the filter logic 228 may store configuration values in memory that are accessed by processes (e.g., production database source code in one embodiment) associated with the capture logics 110A-110M to determine which workload units are to be stored and which are not.

For example, the capture logics 110A-110M may be configured, by way of the filter logic 228, to capture only workload that originates from a selected subset of the clients 104A-N. For another example, the capture logics 110A-110M may be configured by way of the filter logic 228, to capture only workload that originates from a selected subset of application servers 106A-L. For yet another example, capture logics 116A-116M may be configured by way of the filter logic 228, to capture only workload that targets or applies to a selected subset of relational structures (e.g., relational tables) within production database 112.

In one embodiment, the interface logic 222 is configured to prompt a user to select which specific aspects of the workload are to be captured. The configuration logic 224 passes the selections on to the filter logic 228, which adapts the capture logics 110A-110M so only the selected aspects are captured. For example, the filter logic 228 may store configuration values in memory that are accessed by the processes (e.g., production database source code in one embodiment) of the capture logics 110A-110M to determine which workload units are to be stored and which are not.

In one embodiment, the interface logic 222 is configured to prompt for and receive data specifying settings and selections that define various aspects of the functioning of the driver logics 116A-116K. For example, the user may be able to specify the manner in which the driver logics 116A-116K reverse engineer the workload units to construct new calls that conform to OCI or a similar protocol. In one embodiment, the interface logic 222 is configured to prompt for and receive data specifying settings and selections that define how the driver logics 116A-116K balance the workload unit among themselves at replay-time. In one embodiment, the interface logic 222 is configured to prompt for and receive data specifying how connection patterns between application servers 106A-106L and the production data base server(s) are recreated between driver logics 116A-116K and the replay database server(s). In one embodiment, the interface logic 222 is configured to prompt for and receive data specifying how the driver logics 116A-116K maintain statistics concerning the workload units that the driver logic replays.

In one embodiment, the interface logic 222 is configured to prompt for and receive data specifying which of the three replay modes discussed above the user has selected. Recall that in a first mode, the workload units are replayed at the same time intervals, relative to each other, as they were originally "played" or received at capture time. In a second mode, the workload units are replayed as fast as possible, without regard to any time that passed between the original receiving of those workload units at capture time. In a third mode, called "auto replay" mode, the driver logics 116A-116K seek to honor and replicate the inter-workload unit time intervals, similar to the first mode, but also allow inter-workload unit replay time intervals to be shortened when the replay of previous workload units has taken longer than the original "play" or receipt of those workload units took during capture time. The interface logic 222 may be configured to prompt a user for a mode selection at replay time, instead of or in addition to configuration time, which will be described in more detail below.

In one embodiment, the interface logic 222 is configured to prompt for and receive data specifying a user selection for the manner in which the replay database server 118 maintains transactional consistency when replaying the workload to the replay database 120. For example, the user may be able to specify whether the replay database server 118 reads SCNs and server-generated values associated with the workload units directly from the workload buffer 114 during the replay or generates new SCNs and server-generated values. The configuration logic 224 communicates the user selections to the replay database server 118.

In one embodiment, the interface logic 222 is configured to prompt for and receive data specifying user selections regarding the manner in which the replay database logic 122 configures the replay database 120. Recall that prior to the replay, the replay database logic 122 generates a replay database synchronized to the state the production database 112 was in at the beginning of the workload interval (e.g., the logical point in a replay request). In one embodiment, the user interface logic 222 receives, from the user, the identification of a backup or mirror database that should be used as the replay database.

Once the replay and continuous capture related configuration has been completed by the user, the user may, through the interface logic 222 and the configuration logic 224, place the capture logics 110A-110M into "capture mode", enabling the capture logics to begin storing workload in the workload buffer.

As can be seen from the foregoing description, the various embodiments of the replay logic 115 provide automatic orchestration of a continuous capture feature. The replay logic 115 interacts with the capture logics 110A-110M to enable workload capture. The replay logic 115 interacts with the event manager and/or workload buffer 114 to coordinate the export of workload buffer contents to offline storage. The replay logic 115 interacts with the replay database logic 122 to set up the replay database 120 to the correct point in time that corresponds to the first workload unit to be replayed. The replay logic 115 interacts with the clients 106A-106N to coordinate the replaying of the workload for the user.

FIGS. 3A and 3B illustrate two example screenshots 300 and 350, respectively, that are rendered by one embodiment of the interface logic 222 of FIGS. 1 and 2. The interface logic 222 is configured to receive data input by the user interacting with the screens 300 and 350. For the purposes of this description, the user data that is received by the interface logic 222 is shown in data fields with normal font as opposed to fields having bold font, which represents labels that are rendered as part of the screens. In both of the screens, default data may populate the user data fields when the screens are first presented to the user.

FIG. 3A illustrates a configuration screen 300 that is rendered by the interface logic 222 to collect configuration data from a user setting up the continuous capture feature for their production database system. In box 320, the user inputs a target replay time. The target replay time is the amount of time the user wants to be able to replay, on demand. A default value of 60 minutes, or any other time period, may be displayed and the user may be enabled to edit the number. The target replay time field may be linked to an advisor feature described above with respect to the buffer logic 226 of FIG. 2 and illustrated in FIG. 3B. The advisor feature, when activated by the user, makes recommendations for several different aspects of the configuration as will be described in more detail below. The user also selects whether the replay time should be guaranteed or not. This selection will influence the buffer size determined by the advisor feature (e.g., how large of a safety margin is included in the recommended buffer size).

In box 320, the user may also identify capture filters. Recall that capture filters are used to select which types of workload units are captured by the capture logics 110A-110M. For example, the user may select capture filter options that identify a certain client, application, or types of workload units that are captured by the capture logics 110A-110M.

In box 330, the user defines various aspects of the circular workload buffer (e.g., the workload buffer 114 of FIGS. 1 and 2). The user inputs the buffer's location and size. Recall that in one embodiment, the workload buffer is a range of addresses in shared global access memory. The buffer size field may be linked to the advisor feature so that the user may request a recommended buffer size. The user also selects whether the file system to which the workload buffer is exported should be automatically extensible. When the file system is configured to be automatically extensible, additional disk space is made available on demand when the memory allocated to the file system becomes full. When the user designates the file system as automatically extensible, the user also defines an alert threshold. When the file system storing the workload buffer becomes full to the extent of the alert threshold, the user will be notified.

The user may also enable workload buffer exporting in box 330. If the user wants the contents of the workload buffer to be automatically exported, the user selects "Yes" for Export. The user can then select the criteria that will trigger the automatic export. In the illustrated embodiment, the user can specify that the buffer contents be exported every N minutes, or in response to detection of some critical event. In one embodiment, the critical event can be defined in an enterprise manager event management system and referenced by name in box 330. The user also specifies the export location, which may be offline storage used to store database backup data in compressed form.

In box 340, the uses sets replay settings that will be the default settings when a user replays workload on the replay database. The user inputs the replay database configuration, including the replay database's location and size. The replay database configuration field may be linked to the advisor feature. The replay database may be referenced as a backup or mirror database that is already in use as a failover database for the production database. The user also selects other options such as whether the results of the replay are stored in read only or read/write form. The user may also specify that only SQL commands in the captured workload be provided to the replay server. The user may also specify how many minutes of replay should be provided, by default. Many of these replay settings may be reset or changed at replay time by a user interacting with control screen (not shown) that is also provided by the interface logic 222.

FIG. 3B illustrates an example embodiment of a screen shot that may be provided to allow the user to interact with the advisor feature. The advisor feature provides recommendations, upon request, to a user configuring the continuous capture feature using, for example, the screen 300. The advisor feature inputs the data received from the user in screen 300. The screen 350 prompts the user to enter, in box 360, the analysis period that should be considered by the advisor feature. For example, the user may want to consider the production database system's workload throughout the span of a week, a day, or some other time period, depending on the workload fluctuations of the production database. The user is able to enter a target replay time or request that the advisor determine a recommended replay time. Recall that the replay time is the duration of the workload that is stored in the workload buffer 114 and that can be replayed, on demand. The user identifies the target backup database that is to be used as the replay database in box 360 as well as the target location for the workload buffer.

Box 370 shows the results of the advisor feature's analysis. The advisor feature determines if the target backup database is available for use as a replay database. The advisor feature determines if the replay time target is achievable, based on historical workload for the database and the user's replay time target. The advisor feature recommends a workload buffer size. Recall that the buffer size is based on the highest rate of workload units experienced by the production database and the replay time target. Finally, the box 370 illustrates context information, for the user's consideration, including space consumption by programming module as well as space consumption as a function of time. The user may use the context information to select capture filters to capture workload from the modules (e.g., services, programs, actions, and so on) that are consuming the most space or to select a target replay time that adequately covers the rate at which space is consumed.

While two specific screenshots are illustrated in FIGS. 3A and 3B, any number or configuration of screenshots can be utilized by interface logic 222 to allow a user to configure and use the continuous capture feature.

In one embodiment, one or more of the components described herein are configured as program modules stored in a non-transitory computer readable medium. The program modules are configured with instructions that when executed by at least a processor cause the computing device to perform the corresponding function(s).

Figure 4:
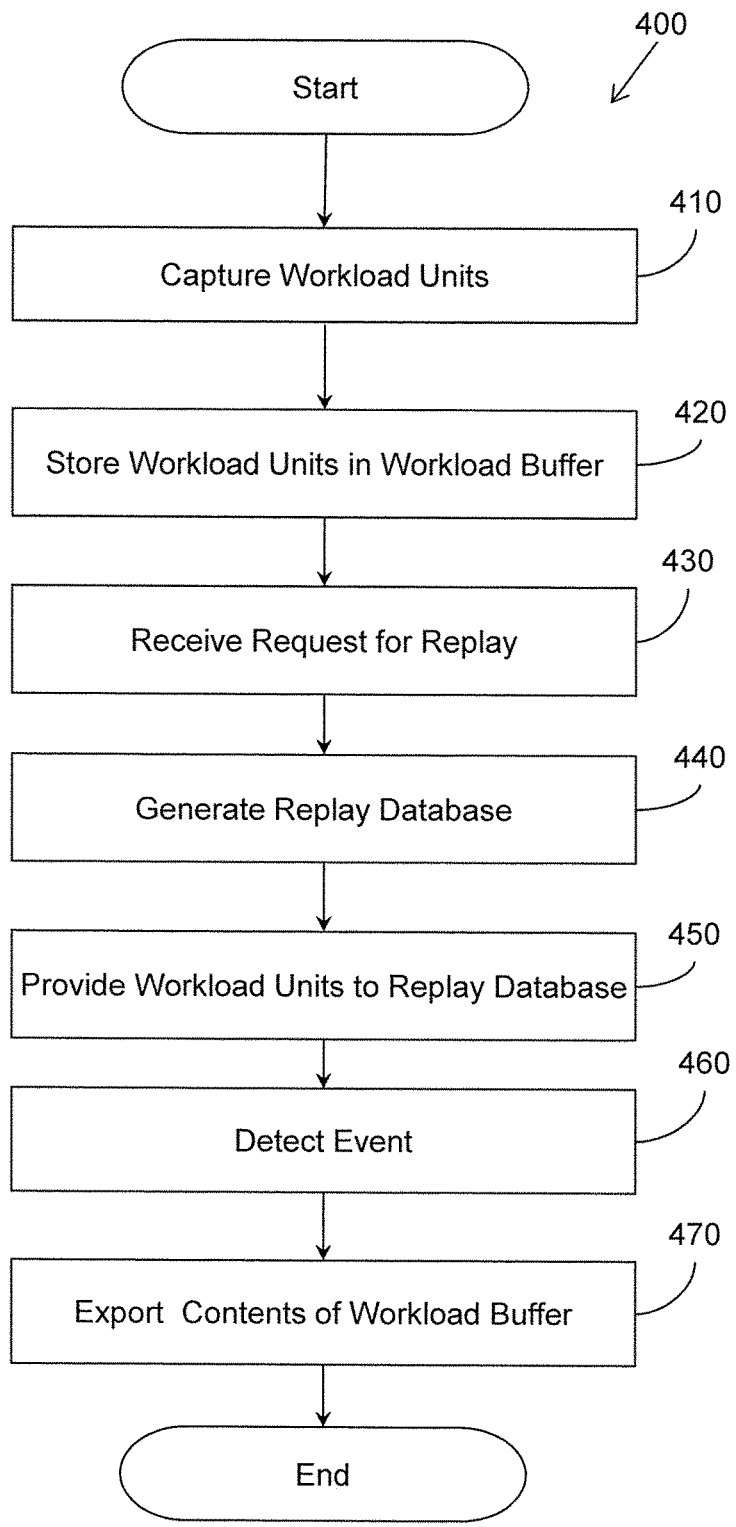
FIG. 4 illustrates an embodiment of a method for providing continuous capture of replayable workload for a database system.

FIG. 4 illustrates one embodiment of a method 400 for replaying a workload experienced by a production database. The method 400 may be performed by the replay logic 115 of FIGS. 1 and 2 and as further explained in FIGS. 3A and 3B.

At 410, workload units being executed on a production database are captured and at 420 the captured workload units are stored in a circular workload buffer. In one embodiment, the capturing and storing is performed by capture logics 110A-110M of FIGS. 1 and 2. In one embodiment, the capture logics 110A-110M are processes implemented in source code for a production database server.

The circular workload buffer is configured to write newest captured workload units over oldest workload units in the workload buffer when the workload buffer becomes full of workload units. Thus the workload buffer, when full, stores a quantity of most recently executed workload units that represent workload units executed on the production database during a workload interval of time. One embodiment of the workload buffer is workload buffer 114 of FIGS. 1 and 2. In one embodiment, the workload buffer is an allocation of shared global access memory that can be accessed by all processes writing workload for the production database system.

At 430, a request to replay selected workload units starting at a logical point is received. The logical point corresponds to a time at which the production database experienced a first captured workload unit. The request may be received by way of a user interacting with the interface logic 222 of FIG. 2 and further explained in FIG. 3A. The request is parsed to identify the logical point and any additional replay settings that the user has included in the request.

In response to the request, at 440 a replay database is generated that corresponds to the production database in a condition in which the production database existed at the logical point. In one embodiment, the generating is performed by the replay database logic 122 of FIGS. 1 and 2. In one embodiment, the replay database is generated by reverting a mirror or backup database for the production database to a condition at which the production database existed at the logical point, or possibly just before the logical point. This means that the replay database will have the same contents, indices, and so on, as the production database. The replay database may be reverted to the logical point by determining a first SCN associated with the first workload unit and rolling the backup database so that the first SCN is the latest SCN represented in the replay database.

At 450 the captured workload units, starting with the first captured workload unit, are provided to a replay database server that executes the captured workload units on the replay database. In one embodiment, the providing is performed by the driver logics 116A-116K of FIGS. 1 and 2. In one embodiment, the manner in which the workload units are provided to the replay database server is controlled by a user interacting with the interface logic 222 to control the speed with which the workload units are provided, select a replay mode, and so on.

At 460, an event is detected and at 440 in response to the event, contents of the workload buffer are exported to offline memory. The exporting includes at least one I/O operation. The event may be a quantity of workload units equal to a capacity of the workload buffer being stored in the workload buffer since a last exporting of the contents of the workload buffer to the offline memory. The event may be a predefined critical event related to the performance of the production database. In one embodiment the detecting is performed by an enterprise manager event management system.

In one embodiment, the method 400 includes determining that the logical point is prior to a time at which the oldest workload unit in the workload buffer was executed on the production database. In response to the determination, the method includes transferring from the offline memory to memory accessible without an I/O operation, data for workload units that were executed on the production database at or after the logical point.

In one embodiment, an advisor feature is provided by the method 400. In this embodiment, the method 400 includes receiving a request for a recommendation for a quantity of memory to be allocated for the workload buffer. The request specifies a desired replay time. Historical workload data for the production database to determine a highest rate at which workload units were experienced by the production database. The method includes calculating an amount of memory required to store workload units executed at the highest rate for the replay time and returning a recommended memory allocation that is based, at least in part, on the calculated amount of memory. In one embodiment, the calculated amount of memory is increased by a safety margin to compute the recommended memory allocation.

As can be seen from the foregoing description, the systems and methods described herein provide continuous capture of replayable workload to enable offline diagnostics of production database system issues, problems, crashes, and critical errors on in a replay database system without having impact on the production database system. Diagnostic effort is reduced by reducing multiple configuration and replay set steps to interaction with a single user interface, limiting the potential for human error. The ability to reproduce problems, errors, or critical events s improved because the systems and methods described herein guarantee a replay of at least a selected number of minutes of workload. The length of the workload to be captured is easy to set and the advisor feature helps guide a user to select an appropriate workload buffer size. The systems and methods described herein provide automatic orchestration end-to-end of workload capture and replay, significantly reducing administrator time and effort.

Computing Device Embodiment

Figure 5:
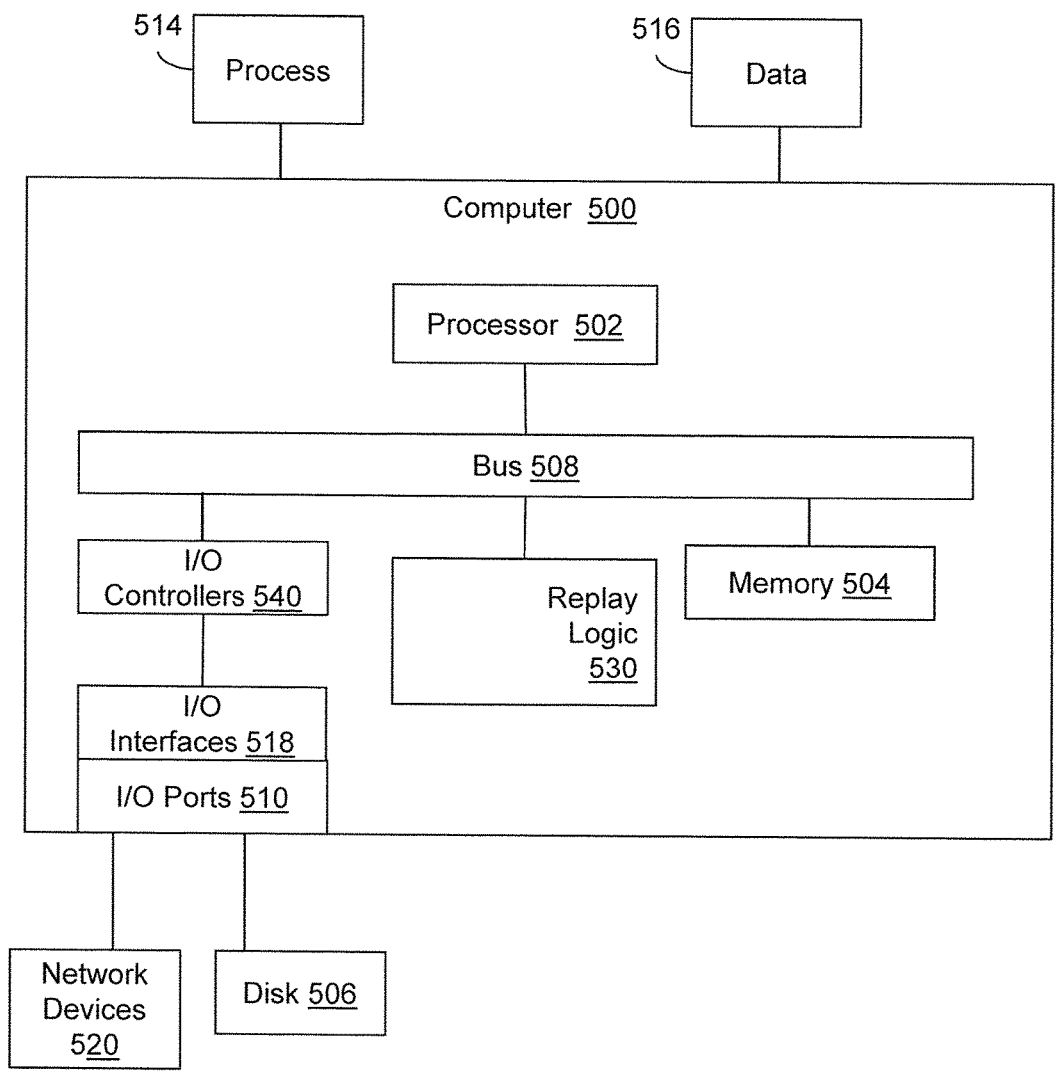
FIG. 5 illustrates an embodiment of a computing system configured with the example systems and/or methods disclosed.

FIG. 5 illustrates an example computing device that is configured and/or programmed with one or more of the example systems and methods described herein, and/or equivalents. The example computing device may be a computer 500 that includes a processor 502, a memory 504, and input/output ports 510 operably connected by a bus 508. In one example, the computer 500 may include management logic 530 configured to facilitate continuous capture of replayable workload for a database system, similar to the replay logic 115 shown in FIGS. 1 and 2 and further explained in FIGS. 3A, 3B, and 4. In different examples, the logic 530 may be implemented in hardware, a non-transitory computer-readable medium with stored instructions, firmware, and/or combinations thereof. While the logic 530 is illustrated as a hardware component attached to the bus 508, it is to be appreciated that in other embodiments, the logic 530 could be implemented in the processor 502, stored in memory 504, or stored in disk 506.

In one embodiment, logic 530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application specific integrated circuit (ASIC) programmed to perform method 400 of FIG. 4 as further explained in FIGS. 1, 2, 3A, and 3B. The means may also be implemented as stored computer executable instructions that are presented to computer 500 as data 516 that are temporarily stored in memory 504 and then executed by processor 502.

Logic 530 may also provide means (e.g., hardware, non-transitory computer-readable medium that stores executable instructions, firmware) for performing the method 400 of FIG. 4 as further explained in FIGS. 1, 2, 3A, and 3B.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, read only memory (ROM), programmable ROM (PROM), and so on. Volatile memory may include, for example, random access memory (RAM), synchronous random access memory (SRAM), dynamic random access memory (DRAM), and so on.

A storage disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a compact disk-read only memory (CD-ROM) drive, a CD recordable (CD-R) drive, a CD read/write (CD-RW) drive, a digital video disc (DVD) ROM, and so on. The memory 504 can store a process 514 and/or a data 516, for example. The disk 506 and/or the memory 504 can store an operating system that controls and allocates resources of the computer 500.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and universal serial bus (USB) ports.

The computer 500 can operate in a network environment and thus may be connected to the network devices 520 via the I/O interfaces 518, and/or the i/o ports 510. Through the network devices 520, the computer 500 may interact with a network. Through the network, the computer 500 may be logically connected to remote computers. Networks with which the computer 500 may interact include, but are not limited to, a local area network (LAN), a wide area network (WAN), and other networks.

DEFINITIONS AND OTHER EMBODIMENTS

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable storage medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer-readable storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, firmware, a non-transitory medium with stored instructions of an executable application or program module, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable storage medium storing computer-executable instructions that when executed by a computer cause the computer to:
receive a request for a recommendation for a quantity of memory to be allocated for a circular workload buffer, where the request specifies a desired replay time;
access historical workload data for a production database to determine a highest rate at which workload units were experienced by the production database;
calculate an amount of memory required to store workload units executed at the highest rate for the desired replay time;
return a recommended memory allocation, that is based, at least in part, on the calculated amount of memory;
allocate memory to the circular workload buffer based, at least in part, on the recommended memory allocation;
capture workload units being executed on the production database;
store the captured workload units in the circular workload buffer, where the circular workload buffer is configured to write newest captured workload units over oldest captured workload units in the circular workload buffer when the circular workload buffer becomes full of the captured workload units, such that the circular workload buffer, when full, stores a quantity of most recently executed workload units that represent workload units executed on the production database during a workload interval of time;
in response to a request to replay selected workload units starting at a logical point, where the logical point corresponds to a point at or before the production database experienced a first captured workload unit:
generate a replay database that corresponds to the production database in a condition in which the production database existed at the logical point; and
provide the captured workload units from the circular workload buffer to a replay database server that executes the captured workload units on the replay database; and
in response to detecting an event, export contents of the circular workload buffer to offline memory, where the exporting includes at least one I/O operation.

2. The non-transitory computer-readable storage medium of claim 1, where the event comprises a quantity of captured workload units equal to a capacity of the circular workload buffer being stored in the circular workload buffer since a last exporting of the contents of the circular workload buffer to the offline memory.

3. The non-transitory computer-readable storage medium of claim 1, where the event comprises a predefined critical event related to performance of the production database.

4. The non-transitory computer-readable storage medium of claim 1, further storing computer-executable instructions that when executed by the computer cause the computer to store the captured workload units in a cache and, when the cache becomes full, transfer the captured workload units from the cache to the circular workload buffer.

5. The non-transitory computer-readable storage medium of claim 1, where the offline memory is non-volatile memory and the non-transitory computer-readable storage medium further stores computer-executable instructions that when executed by the computer cause the computer to:
determine that the logical point is prior to a time at which an oldest captured workload unit in the circular workload buffer was executed on the production database; and
in response to the determination, transfer from the offline memory to volatile memory, data for captured workload units that were executed on the production database at or after the logical point.

6. The non-transitory computer-readable storage medium of claim 1, where the allocating memory to the circular workload buffer based, at least in part, on the recommended memory allocation comprises allocating the circular workload buffer in shared global access memory.

7. A computing system, comprising:
replay logic configured to:
receive a request for a recommendation for a quantity of memory to be allocated for a circular workload buffer, where the request specifies a desired replay time;
access historical workload data for a production database to determine a highest rate at which workload units were experienced by the production database;
calculate an amount of memory required to store workload units executed at the highest rate for the desired replay time; and
return a recommended memory allocation, that is based, at least in part, on the calculated amount of memory;
memory having a specified quantity of space allocated to the circular workload buffer, where the specified quantity of space is based, at least in part, on the recommended memory allocation;
capture logic configured to capture workload units being executed on the production database and store captured workload units in the circular workload buffer;
where the circular workload buffer is configured to write newest captured workload units over oldest captured workload units in the circular workload buffer when the circular workload buffer becomes full of the captured workload units, such that the circular workload buffer, when full, stores a quantity of most recently executed workload units that represent workload units executed on the production database during a workload interval of time;
where the replay logic configured to, in response to a request to replay selected workload units starting at a logical point, where the logical point corresponds to a point at or before the production database experienced a first captured workload unit:
generate a replay database that corresponds to the production database in a condition in which the production database existed at the logical point; and
provide the captured workload units from the circular workload buffer to a replay database server that executes the captured workload units on the replay database; and
where the replay logic is configured to, in response to detecting an event, export contents of the circular workload buffer to offline memory, where the exporting includes at least one I/O operation.

8. The computing system of claim 7, where the event comprises a quantity of captured workload units equal to a capacity of the circular workload buffer being stored in the circular workload buffer since a last exporting of the contents of the circular workload buffer to the offline memory.

9. The computing system of claim 7, where the event comprises a predefined critical event related to performance of the production database.

10. The computing system of claim 7, where the capture logic is further configured to store the captured workload units in a cache and, when the cache becomes full, transfer the captured workload units from the cache to the circular workload buffer.

11. The computing system of claim 7, where the offline memory is non-volatile memory and the replay logic is configured to:
determine that the logical point is prior to a time at which an oldest captured workload unit in the circular workload buffer was executed on the production database; and in response to the determination, transfer from the offline memory to volatile memory, data for captured workload units that were executed on the production database at or after the logical point.

12. A computer-implemented method, comprising:
receiving a request for a recommendation for a quantity of memory to be allocated for a circular workload buffer, where the request specifies a desired replay time;
accessing historical workload data for a production database to determine a highest rate at which workload units were experienced by the production database;
calculating an amount of memory required to store workload units executed at the highest rate for the desired replay time;
returning a recommended memory allocation, that is based, at least in part, on the calculated amount of memory;
allocating memory to the circular workload buffer based, at least in part, on the recommended memory allocation;
capturing workload units being executed on the production database;
storing the captured workload units in the circular workload buffer, where the circular workload buffer is configured to write newest captured workload units over oldest captured workload units in the circular workload buffer when the circular workload buffer becomes full of the captured workload units, such that the circular workload buffer, when full, stores a quantity of most recently executed workload units that represent workload units executed on the production database during a workload interval of time;
in response to a request to replay selected workload units starting at a logical point, where the logical point corresponds to a point at or before the production database experienced a first captured workload unit:
generating a replay database that corresponds to the production database in a condition in which the production database existed at the logical point; and
providing the captured workload units from the circular workload buffer to a replay database server that executes the captured workload units on the replay database; and
in response to detecting an event, exporting contents of the circular workload buffer to offline memory, where the exporting includes at least one I/O operation.

13. The computer-implemented method of claim 12, where the event comprises a quantity of captured workload units equal to a capacity of the circular workload buffer being stored in the circular workload buffer since a last exporting of the contents of the circular workload buffer to the offline memory.

14. The computer-implemented method of claim 12, where the event comprises a predefined critical event related to performance of the production database.

15. The computer-implemented method of claim 12, storing the captured workload units in a cache and, when the cache becomes full, transferring the captured workload units from the cache to the circular workload buffer.

16. The computer-implemented method of claim 15, where the offline memory is non-volatile memory and the computer-implemented method comprises:
determining that the logical point is prior to a time at which an oldest captured workload unit in the circular workload buffer was executed on the production database; and in response to the determination, transferring from the offline memory to volatile memory, data for captured workload units that were executed on the production database at or after the logical point.

17. The computer-implemented method of claim 12, where the allocating memory to the circular workload buffer based, at least in part, on the recommended memory allocation comprises allocating the circular workload buffer in shared global access memory.

* * * * *

UNITED STATES PATENT AND TRADEMARK OFFICE
CERTIFICATE OF CORRECTION

Page 1 of 1

PATENT NO. : 9,983,918 B2
APPLICATION NO. : 14/974059
DATED : May 29, 2018
INVENTOR(S) : Gongloor et al.

It is certified that error appears in the above-identified patent and that said Letters Patent is hereby corrected as shown below:

In the Drawings

On sheet 4 of 6, in Figure 3B, under Reference Numeral 360, Line 2, delete "Analyis" and insert -- Analysis --, therefor.

On sheet 4 of 6, in Figure 3B, under Reference Numeral 370, Line 3, delete "Achivable?:" and insert -- Achievable?: --, therefor.

In the Specification

In Column 3, Line 10, delete "and or" and insert -- and/or --, therefor.

In Column 22, Line 48, delete "and or" and insert -- and/or --, therefor.

In the Claims

In Column 36, Line 57, in Claim 15, after "claim 12," insert -- comprising --.

Signed and Sealed this
Fifth Day of February, 2019

Andrei Iancu
*Director of the United States Patent and Trademark Office*